(12) United States Patent
Kaneko

(10) Patent No.: US 12,498,380 B2
(45) Date of Patent: Dec. 16, 2025

(54) ANALYSIS METHOD, PEPTIDE ANTIOXIDIZING AGENT FOR USE IN MAKK SPECTROMETRY AND KIT FOR USE IN MASS SPECTROMETRY

(71) Applicant: SHIMADZU CORPORATION, Kyoto (JP)

(72) Inventor: Naoki Kaneko, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1318 days.

(21) Appl. No.: 16/965,117

(22) PCT Filed: Jan. 28, 2019

(86) PCT No.: PCT/JP2019/002726
§ 371 (c)(1),
(2) Date: Dec. 23, 2020

(87) PCT Pub. No.: WO2019/146780
PCT Pub. Date: Aug. 1, 2019

(65) Prior Publication Data
US 2021/0123925 A1   Apr. 29, 2021

(30) Foreign Application Priority Data
Jan. 29, 2018   (JP) .................. 2018-013052

(51) Int. Cl.
*C07K 1/22* (2006.01)
*G01N 33/68* (2006.01)
(52) U.S. Cl.
CPC .......... *G01N 33/6851* (2013.01); *C07K 1/22* (2013.01); *G01N 2560/00* (2013.01)

(58) Field of Classification Search
CPC ... G01N 33/6851; G01N 2560/00; C07K 1/22
See application file for complete search history.

(56) References Cited

U.S. PATENT DOCUMENTS

2005/0282261 A1   12/2005   Sauter et al.
2017/0152541 A1*   6/2017   Sweredoski ............ C12P 21/02

FOREIGN PATENT DOCUMENTS

| JP | 07-059548 A | 3/1995 |
| JP | 2000-140102 A | 5/2000 |
| JP | 2006-512068 A | 4/2006 |
| JP | 2007-292523 A | 11/2007 |
| JP | 2007-309673 A | 11/2007 |

(Continued)

OTHER PUBLICATIONS

Office Action issued Mar. 17, 2022 in Indian Application No. 202047037071.

(Continued)

*Primary Examiner* — Jill A Warden
*Assistant Examiner* — Michael Stanley Gzybowski
(74) *Attorney, Agent, or Firm* — Sughrue Mion, PLLC

(57) ABSTRACT

An analysis method includes: preparing a sample containing peptide to be analyzed and an antioxidizing agent for preventing oxidation of methionine, the antioxidizing agent containing a protein, ionizing the peptide by laser desorption/ionization; and mass-separating and detecting the peptide that has been ionized.

14 Claims, 25 Drawing Sheets
Specification includes a Sequence Listing.

(56) References Cited

FOREIGN PATENT DOCUMENTS

JP   2013-102736 A   5/2013

OTHER PUBLICATIONS

Office Action dated Dec. 22, 2022 from the Chinese Patent Office in Application No. 201980023278.1.
Third Office Action dated Nov. 29, 2022 from the Japanese Patent Office in JP Application No. 2019-567201.
First Office Action dated Oct. 24, 2023 issued for the corresponding Japanese Patent Application No. 2022-144143.
Second Office Action dated May 10, 2022 from the Japanese Patent Office in JP Application No. 2019-567201.
Office Action dated Apr. 25, 2023 from the Japanese Patent Office in Application No. 2019-567201.
Office Action issued Aug. 8, 2023 in Chinese Application No. 201980023278.1.
Niklas Gustavsson et al., "A peptide methionine sulfoxide reductase highly expressed in photosynthetic tissue in *Arabidopsis thaliana* can protect the chaperone-like activity of a chloroplast-localized small heat shock protein", The Plant Journal, 2002, pp. 545-553, vol. 29, No. 5.
Damon I. Papac et al., "Direct Analysis of Affinity-Bound Analytes by MALDI/TOF MS", Anal Chem., 1994, pp. 2609-2613, vol. 66.
Tetsu Kobayashi et al., "Improved sensitivity for insulin in matrix-assisted laser desorption/ionization time-of-flight mass spectrometry by premixing α-cyano-4-hydroxycinnamic acid matrix with transferrin" Rapid Commun. Mass Spectrom., 2004, pp. 1156-1160, vol. 18.
International Search Report of PCT/JP2019/002726 dated Mar. 26, 2019 [PCT/ISA/210].
Written Opinion of PCT/JP2019/002726 dated Mar. 26, 2019 [PCT/ISA/237].
Japanese Office Action issued Apr. 16, 2024 in Application No. 2022-144143.

* cited by examiner

BSA

TRANSFERRIN

FETUIN

BSA + GLYCINE (COMPARATIVE EXAMPLE)

BSA + GLYCINE (COMPARATIVE EXAMPLE)

BSA + L-METHIONINE

BSA + L-METHIONINE

BSA + L-CYSTEINE

BSA + L-HISTIDINE

BSA+DTT

BSA+DTT

ANALYSIS METHOD, PEPTIDE ANTIOXIDIZING AGENT FOR USE IN MAKK SPECTROMETRY AND KIT FOR USE IN MASS SPECTROMETRY

CROSS REFERENCE TO RELATED APPLICATIONS

This application is a National Stage of International Application No. PCT/JP2019/002726, filed Jan. 28, 2019, claiming priority to Japanese Patent Application No. 2018-013052, filed Jan. 29, 2018, the contents of all of which are incorporated herein by reference in their entirety.

TECHNICAL FIELD

The present invention relates to an analysis method, a peptide antioxidizing agent for use in mass spectrometry, and a kit for use in mass spectrometry.

BACKGROUND ART

Mass spectrometry using matrix-assisted laser desorption/ionization (MALDI) is a powerful means for analyzing biomolecules such as peptides. However, when a sample is subjected to ionization by MALDI or the like, peptide in the sample has often been oxidized after the sample is placed on a sample plate.

Oxidation of peptide on the sample plate is more likely to occur if the concentration of molecules in the sample is low, the sample plate contains, as impurity, copper which catalyzes oxidation, the oxygen content in the sample is high, or the like. Such oxidation of peptide on the sample plate may cause false analysis such that it appears to be more oxidized than the actual oxidation state of the sample.

Specifically, a methionine residue in the main chain of peptide is more likely to be oxidized than other amino acid residues. Such oxidation of methionine residue replaces a sulfur atom on its side chain with sulfoxide in many cases.

PTL 1 proposes a method intended to convert each methionine-containing chemical species in a protein-peptide sample to a methionine oxidized form. Such method changes the oxidation state of the sample. NPTL 1 indicates that proteins such as bovine serum albumin (BSA) and transferrin have been added to increase sensitivity of mass spectrometry for high-mass peptides with 3000 Da or higher such as insulin, but does not describe the purpose or effect of inhibiting the oxidation.

CITATION LIST

Patent Literature

PTL1: JP 2007-292523 A

Non-Patent Literature

NPTL1: Gustaysson N, Kokke B P, Hamdahl U, Silow M, Bechtold U, Poghosyan Z, Murphy D, Boelens W C, Sundby C. "A peptide methionine sulfoxide reductase highly expressed in photosynthetic tissue in *Arabidopsis thaliana* can protect the chaperone-like activity of a chloroplast-localized small heat shock protein," The Plant Journal, (the United States), Society for Experimental Biology, Mar. 1, 2002, Volume 29, Issue 5, pp. 545-553

SUMMARY OF INVENTION

Technical Problem

An efficient method for inhibiting oxidation of methionine in peptide in mass spectrometry is desirable.

Solution to Problem

According to the 1st aspect of the present invention, an analysis method comprises: preparing a sample containing peptide to be analyzed and an antioxidizing agent for preventing oxidation of methionine, the antioxidizing agent containing a protein, ionizing the peptide by laser desorption/ionization; and mass-separating and detecting the peptide that has been ionized.

According to the 2nd aspect of the present invention, in the analysis method according to the 1st aspect, the laser desorption/ionization is matrix-assisted laser desorption/ionization.

According to the 3rd aspect of the present invention, in the analysis method according to the 1st or 2nd aspect, a concentration of the protein is 27.5 nM or more to less than 275 nM.

According to the 4th aspect of the present invention, in the analysis method according to the 3rd aspect, the concentration of the protein is less than 260 nM.

According to the 5th aspect of the present invention, in the analysis method according to the 4th aspect, the concentration of the protein is 45.2 nM or more to less than 151 nM.

According to the 6th aspect of the present invention, in the analysis method according to any one of the 1st through 5th aspects, the antioxidizing agent contains, besides the protein, an amino acid and/or reducing agent.

According to the 7th aspect of the present invention, in the analysis method according to the 6th aspect, the amino acid and/or reducing agent is at least one compound selected from the group consisting of methionine, histidine, cysteine, tryptophan, dithiothreitol, tris(2-carboxyethyl)phosphine, 2-mercaptoethanol, tri-n-butylphosphine, dithioerythritol, ascorbic acid, polyphenol, sodium pyrosulfite, citric acid, glucose, carotene, tocopherol, thio-glycolic acid, N-acetylcysteine, hydroxylamine, reduced glutathione, 2-aminoethyl isothiouronium bromide, and thioglycerol.

According to the 8th aspect of the present invention, in the analysis method according to the 6th or 7th aspect, a concentration of the amino acid and/or reducing agent is 0.001 mM or more to 10 mM or less.

According to the 9th aspect of the present invention, in the analysis method according to the 1st or 2nd aspect, the peptide is purified by affinity purification; the protein is a ligand used in the affinity purification; and the analysis method further comprises, in the affinity purification, before or after elution of the peptide with an eluent, adding an amino acid and/or reducing agent to the eluent.

According to the 10th aspect of the present invention, in the analysis method according to the 9th aspect, the amino acid and/or reducing agent is at least one compound selected from the group consisting of methionine, histidine, cysteine, tryptophan, dithiothreitol, tris(2-carboxyethyl)phosphine, 2-mercaptoethanol, tri-n-butylphosphine, dithioerythritol, ascorbic acid, polyphenol, sodium pyrosulfite, citric acid, glucose, carotene, tocopherol, thio-glycolic acid, N-acetylcysteine, hydroxylamine, reduced glutathione, 2-aminoethyl isothiouronium bromide, and thioglycerol.

According to the 11th aspect of the present invention, in the analysis method according to the 9th or 10th aspect, a concentration of the amino acid and/or reducing agent is 0.0001 mM or more to 10 mM or less.

According to the 12th aspect of the present invention, a peptide antioxidizing agent for use in mass spectrometry for preventing oxidation of methionine comprises a protein, wherein the antioxidizing agent is used in preparation of a sample in mass spectrometry in which peptide to be analyzed is ionized by laser desorption/ionization.

According to the 13th aspect of the present invention, in the peptide antioxidizing agent for use in mass spectrometry according to the 12th aspect, a concentration of the protein is 27.5 nM or more to less than 275 nM.

According to the 14th aspect of the present invention, the peptide antioxidizing agent for use in mass spectrometry according to the 12th or 13th aspect, further comprises: besides the protein, an amino acid and/or reducing agent.

According to the 15th aspect of the present invention, in the peptide antioxidizing agent for use in mass spectrometry according to the 14th aspect, the amino acid and/or reducing agent is at least one compound selected from the group consisting of methionine, histidine, cysteine, tryptophan, dithiothreitol, tris(2-carboxyethyl)phosphine, 2-mercaptoethanol, tri-n-butylphosphine, dithioerythritol, ascorbic acid, polyphenol, sodium pyrosulfite, citric acid, glucose, carotene, tocopherol, thio-glycolic acid, N-acetylcysteine, hydroxylamine, reduced glutathione, 2-aminoethyl isothiouronium bromide, and thioglycerol.

According to the 16th aspect of the present invention, in the peptide antioxidizing agent for use in mass spectrometry according to any one of the 12th through 15th aspects, the laser desorption/ionization is matrix-assisted laser desorption/ionization.

According to the 17th aspect of the present invention, a kit for use in mass spectrometry comprises: the peptide antioxidizing agent for use in mass spectrometry according to any one of the 12th through 16th aspects; and at least one selected from the group consisting of a sample plate and a matrix.

Advantageous Effects of Invention

The present invention enables efficient inhibition of the oxidation of methionine in peptide in mass spectrometry and more accurate measurement of the oxidation state of methionine in the sample than before.

DESCRIPTION OF EMBODIMENTS

Embodiments of the present invention will be described below with reference to the drawings.

First Embodiment

In the analysis method according to the first embodiment, a protein is added as an antioxidizing agent to a sample to be subjected to mass spectrometry in order to prevent oxidation of methionine of peptide in the sample.

Figure 1:
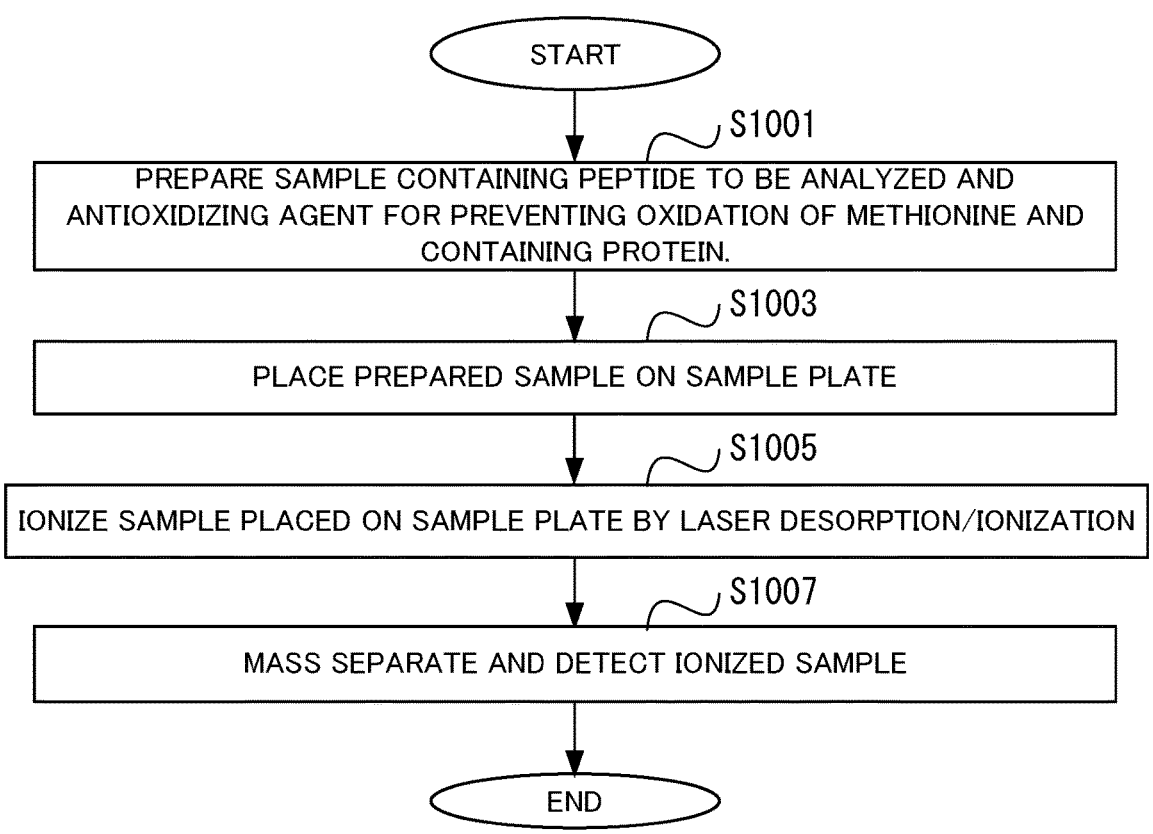
FIG. 1 is a flowchart illustrating flow of an analysis method according to a first embodiment.

FIG. 1 is a flowchart illustrating flow of the analysis method according to this embodiment. In the step S1001, a sample, which contains peptide to be analyzed and an antioxidizing agent comprising a protein for preventing oxidation of methionine, is prepared. The peptide to be analyzed (hereinafter referred to as target peptide) may have an amino acid sequence which has been identified entirely or partially and may contain methionine or may have an unknown amino acid sequence. The number of residues in the amino acid sequence of the target peptide is not particularly limited, and is 100 or less, preferably 50 or less as in each peptide used in the examples to be described later.

In the examples to be described later, proteins such as bovine serum albumin (hereinafter referred to as BSA), transferrin, and fetuin are used as antioxidizing agents, but the kind of the protein (hereinafter referred to as an antioxidative protein) added to each sample as an antioxidizing agent is not limited to particular one. It is considered that since the sample contains, besides the target peptide, a molecule to be easily oxidized, targets to be oxidized are dispersed therein, thereby preventing oxidation of the target peptide.

More specifically, in the step S1001, the antioxidative protein is added to a solution (hereinafter referred to as a sample solution) containing the target peptide to have a predetermined concentration. The concentration of the antioxidative protein is preferably 27.5 nM or more, more preferably 35.0 nM or more, yet more preferably 39.9 nM or more, even more preferably 45.2 nM or more. The amount of substance of the antioxidative protein in each well is preferably 27.5 fmol/well or more, more preferably 35.0 fmol/well or more, yet more preferably 39.9 fmol/well or more, even more preferably 45.2 fmol/well or more. The amount (in mass basis) of the antioxidative protein in each well is preferably 1 ng/well or more, more preferably 3 ng/well or more. The higher the concentration or amount of the antioxidative protein is, the higher the effect of preventing oxidation of the target peptide becomes, which is preferable.

The concentration of the antioxidative protein is preferably less than 275 nM, more preferably less than 260 nM, yet more preferably less than 151 nM, even more preferably less than 133 nM. The amount of substance of the antioxidative protein in each well is preferably less than 275 fmol/well, more preferably less than 260 fmol/well, yet more preferably less than 151 fmol/well, even more preferably less than 133 fmol/well. The amount (in mass basis) of the antioxidative protein in each well is preferably less than 30 ng/well, more preferably 10 ng/well or less. If the concentration or amount of the antioxidative protein is too high, ion suppression or generation of unintended substances is likely to occur by the antioxidative protein, which is undesirable.

Further, a solution (hereinafter referred to as an additive-containing matrix solution) containing a matrix and a matrix additive is prepared. The kind of the matrix is not particularly limited, and, for example, α-cyano-4-hydroxycinnamic acid (hereinafter referred to as CHCA), 2,5-dihydroxybenzoic acid (hereinafter referred to as DHB), or sinapic acid can be used. The kind of the matrix additive is not particularly limited, and for example, methylenediphosphonic acid (hereinafter referred to as MDPNA) can be used. After the step S1001, the step S1003 is started.

In the step S1003, the sample prepared in the step S1001 is placed on a sample plate for mass spectrometer. The additive-containing matrix solution placed in each well of the sample plate is dried, and a sample solution containing an antioxidative protein added was then added to the dried matrix and thereafter is dried. As the sample plate, a sample plate for MALDI is used, but if no matrix is used, a sample plate for laser desorption/ionization is used. After the step S1003, the step S1005 is started.

How to prepare a sample for use in mass spectrometry is not limited to the above method, and for example, a solution containing target peptide, an antioxidative protein, a matrix, and a matrix additive may be prepared, and this solution may be placed on a sample plate and dried.

In the step S1005, the sample placed on the sample plate is ionized by laser desorption/ionization. The sample mixed with the matrix on the sample plate and dried in the step S1003 is irradiated with a laser beam emitted from laser equipment of the mass spectrometer, thereby causing ionization of the sample. Although, as the laser beam, ultraviolet light at a wavelength of 337 nm is used, any laser beam suitable for the ionization can be used without particular limitation. In this embodiment, MALDI of mixing a matrix and a sample and thereafter irradiating the mixture with a laser beam as mentioned above is shown as an example. However, the laser desorption/ionization using no matrix is also applicable to the present invention. After the step S1005, the step S1007 is started.

In the step S1007, the sample ionized in the step S1005 is mass-separated and detected. Any type of mass spectrometer which can detect target peptide with desired accuracy can be used for mass separation of the ionized sample without particular limitation, but a time-of-flight mass spectrometer is preferable from the viewpoint of accurately performing mass separation even if the peptide has a high mass of several thousands Da or higher. A mass spectrum is created based on detected signals indicating intensities of mass-separated ions. For example, in the time-of-flight mass spectrometer, the time of flight is converted into m/z based on calibration data that has been obtained in advance, and the intensity of detected ion corresponding to m/z is shown in a mass spectrum. In addition, data measured by mass spectrometry are analyzed as appropriate. After the step S1007, the process is completed.

Figure 2:
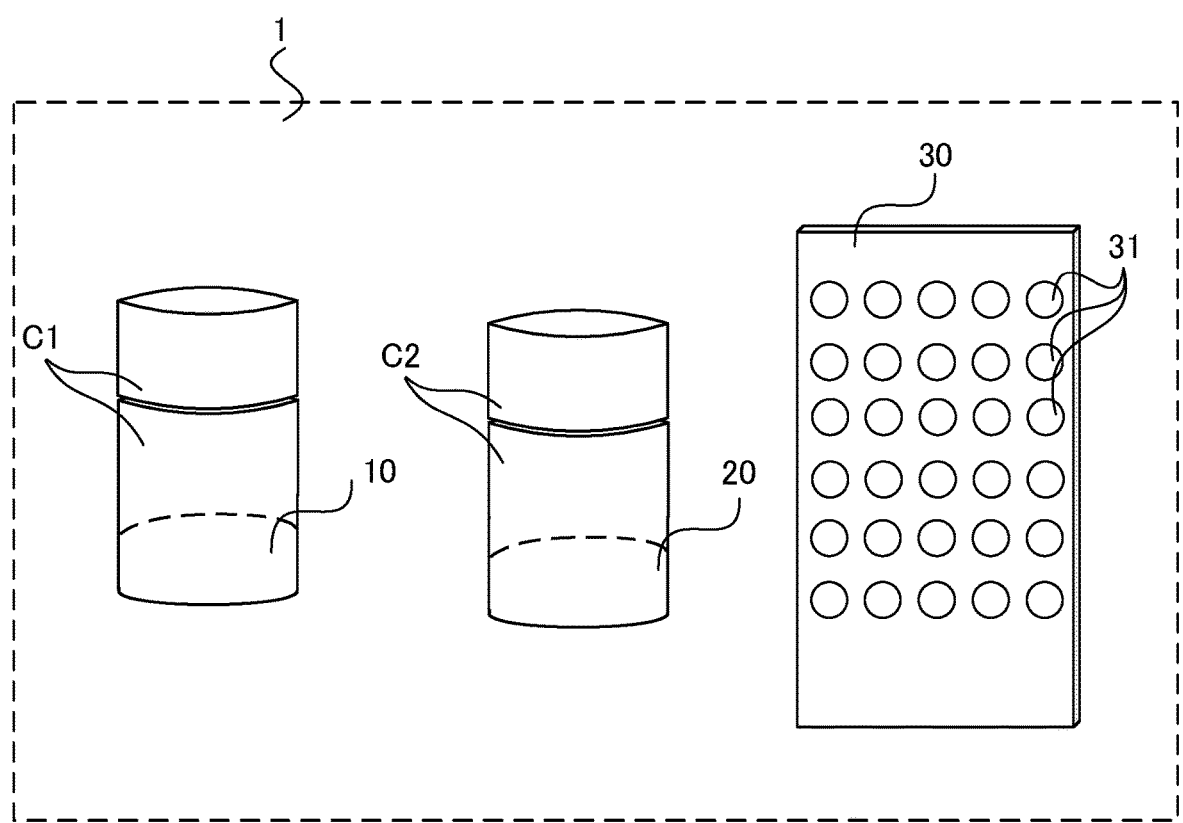
FIG. 2 is a schematic view illustrating a kit for use in mass spectrometry according to the first embodiment.

FIG. 2 is a schematic view illustrating a kit for use in mass spectrometry for providing reagents and the like used in the analysis method according to this embodiment. The kit for use in mass spectrometry 1 includes an antioxidative protein 10, a matrix 20, and a sample plate 30.

The antioxidative protein 10 is used for preparation of a sample to be ionized by laser desorption/ionization, particularly MALDI, and is a peptide antioxidizing agent for use in mass spectrometry, which prevents oxidation of methionine in a target peptide. The matrix 20 includes a matrix such as CHCA, DHB, or sinapic acid mentioned above. The matrix 20 may be in a solid state or a state of being dissolved in any solvent including water and/or acetonitrile. In FIG. 2, the antioxidative protein 10 and the matrix 20 are stored in a container C1 and a container C2, respectively, and the kinds, shapes, and the like of the containers C1 and C2 are not particularly limited. The sample plate 30 is a sample plate for use in laser desorption/ionization, particularly MALDI and has a plurality of wells 31. The shapes, number, and positions for arrangement of the wells 31 are not particularly limited.

The kit for use in mass spectrometry according to this embodiment is required to contain at least the antioxidative protein 10, may not contain the matrix 20 and the sample plate 30, and may contain one or both of them.

Example of First Embodiment

The following shows an example according to this embodiment, but the present invention is not to be limited by the example.

1-1. Preparation of Sample Solution Containing Antioxidative Protein

Each sample solution obtained by adding either protein of BSA (NACALAI TESQUE, INC.), Human transferrin (Sigma-Aldrich), or Bovine fetuin (Sigma-Aldrich) to a mixture of three kinds of peptides Aβ1-40 (Anaspec), Aβ1-42 (Anaspec), and APP669-711 (PEPTIDE INSTITUTE, INC.), and sample solution obtained without adding the protein to the mixture was prepared. As a solvent for the sample solution, 70% (v/v) acetonitrile containing 5 mM hydrochloric acid was used. The concentrations of the protein in the respective sample solutions were 0.1, 0.3, 1, 3, 10, 30, and 100 ng/µL. In addition, each sample solution that does not contain any of the three proteins mentioned above and contains 10, 100, or 1000 fmol/µL Aβ1-40 (hereinafter referred to as Aβ1-40 solution) was prepared.

Amino acid sequences of peptides to be analyzed (target peptides) represented by one letter code and corresponding SEQ ID NOs in the sequence listing are shown in Table 1 below. Since each of Aβ1-40 and Aβ1-42 has one methionine (M) residue, there is only one site to be easily oxidized, corresponding to a sulfur atom on its side chain. Since APP669-711 has two methionine residues, there are two sites to be easily oxidized.

TABLE 1

| SEQ ID NO | Peptide | Sequence |
|---|---|---|
| 1 | Aβ1-40 | DAEFRHDSGYEVHHQKLVFFAEDVGSNKGAI IGLMVGGVV |
| 2 | Aβ1-42 | DAEFRHDSGYEVHHQKLVFFAEDVGSNKGAI IGLMVGGVVIA |
| 3 | APP669-711 | VKMDAEFRHDSGYEVHHQKLVFFAEDVGSNK GAIIGLMVGGVV |

1-2. Time-of-Flight Mass Spectrometry

As a matrix for mass spectrometry, CHCA was used. A matrix solution was prepared by dissolving 1 mg of CHCA in 1 mL of 70% (v/v) acetonitrile. 0.4% (w/v) MDPNA solution containing MDPNA as a matrix additive was used as a matrix additive solution. The matrix solution and the matrix additive solution were mixed in equal amounts to prepare an additive-containing matrix solution. Then, 0.5 µL of the additive-containing matrix solution was added dropwise on each well of a sample plate for MALDI (µfocus MALDI plate 900 µm, Hudson Surface Technology, Inc., Fort Lee, NJ) and dried. Thereafter, 1 µL of the sample solution prepared in the Section 1-1 above was added dropwise on the matrix on the sample plate and dried.

The time-of-flight mass spectrometry using MALDI (hereinafter referred to as MALDI-TOF MS) is performed in a linear mode, using an AXIMA Performance (Shimadzu/KRATOS, Manchester, UK), and detection was performed in a positive ion mode. The m/z value was represented by an average mass of peak. The m/z value was calibrated using human angiotensin II, human ACTH fragment 18-39, bovine insulin oxidized beta-chain, and bovine insulin, as external standards.

1-3. Concentration and Oxidation State of Peptide

Figure 3:
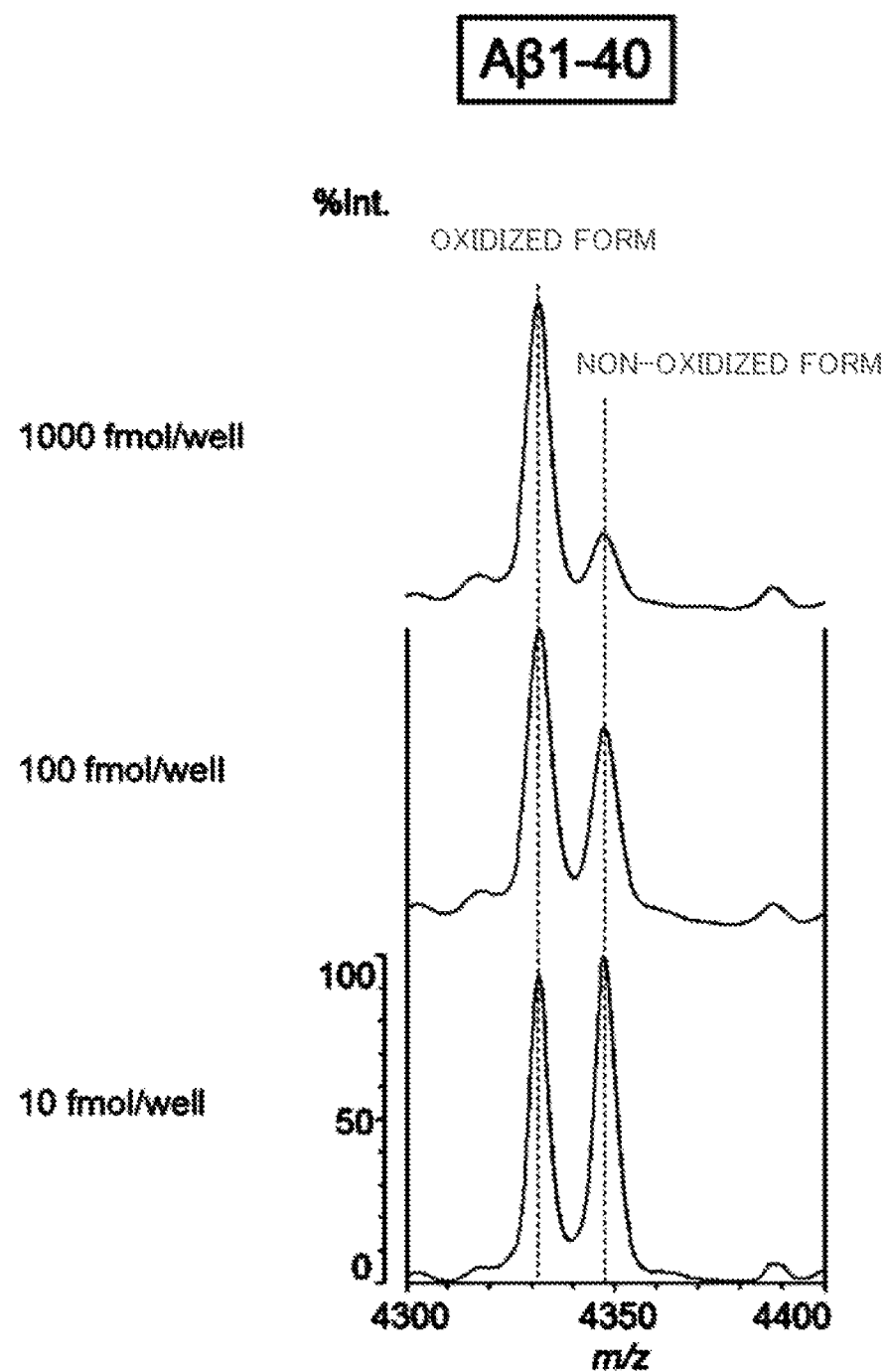
FIG. 3 shows peaks of peptide Aβ1-40 in mass spectra at varying concentrations of peptide Aβ1-40

FIG. 3 shows peaks of Aβ1-40 in mass spectra obtained by mass spectrometry of samples (10 to 1000 fmol/well Aβ1-40) which are obtained by adding 1 µL of Aβ1-40 solutions (10 to 1000 fmol/µL) dropwise on a sample plate and drying the Aβ1-40 solutions. The lower the concentration of the peptide was, the more intensively a peak of the oxidized form were detected than that of the non-oxidized form, and at 10 fmol/well, the peak height of the oxidized form was the same as that of the non-oxidized form.

1-4. Evaluation of Inhibition of Oxidation by Protein

Figure 4:
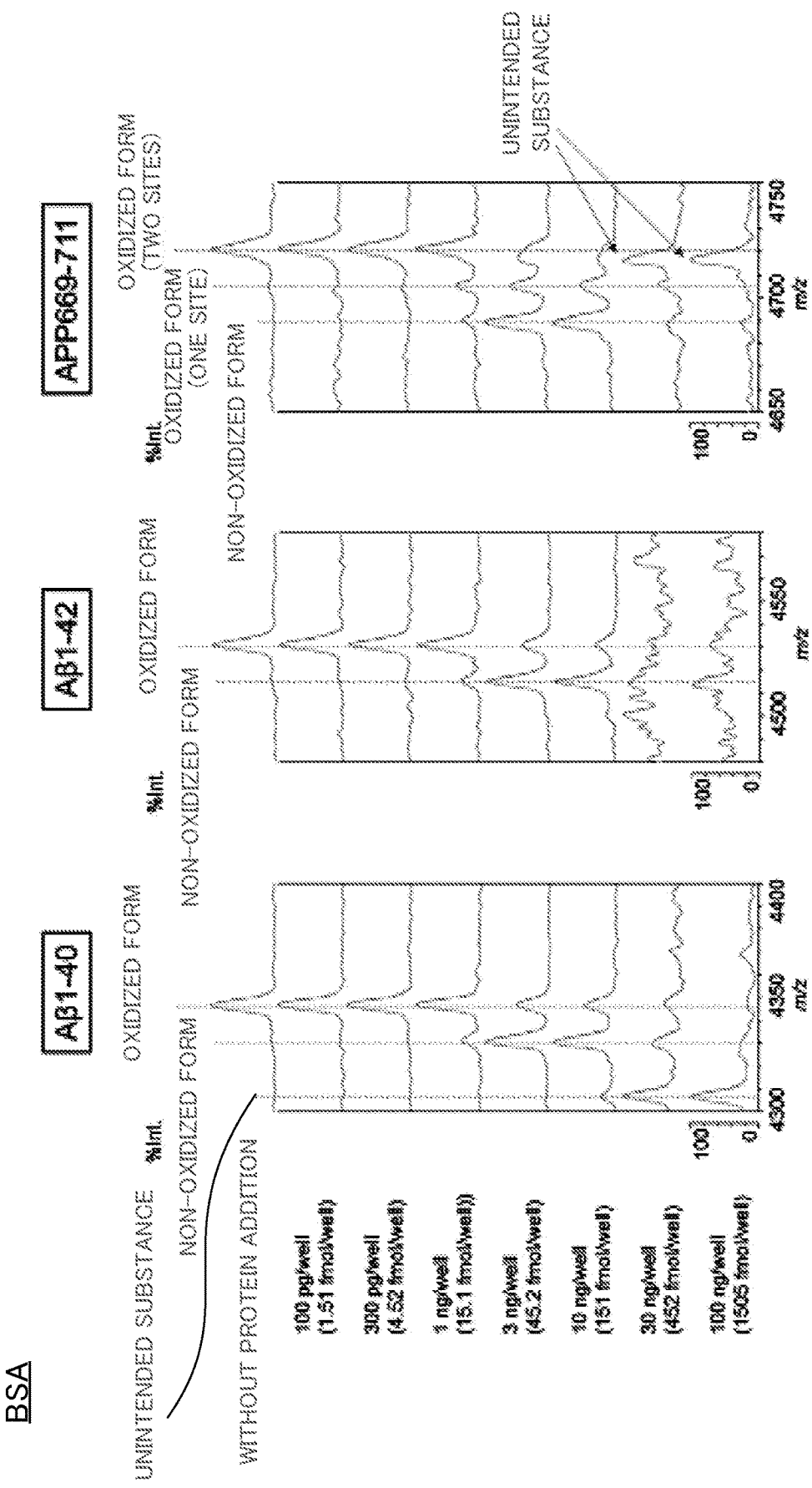
FIG. 4 shows peaks of peptides in mass spectra at varying concentrations of BSA.
Figure 6:
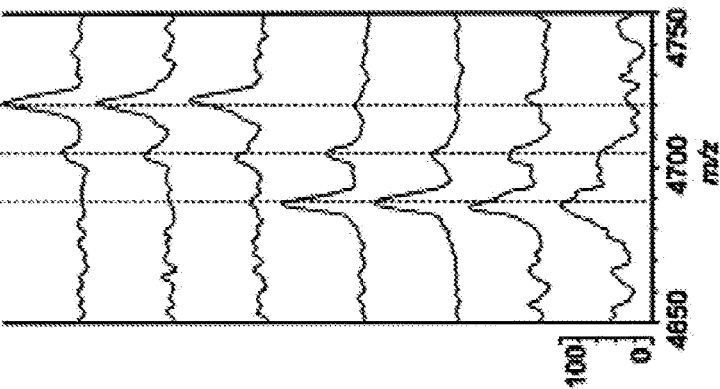
FIG. 6 shows peaks of peptides in mass spectra at varying concentrations of transferrin.
Figure 6:
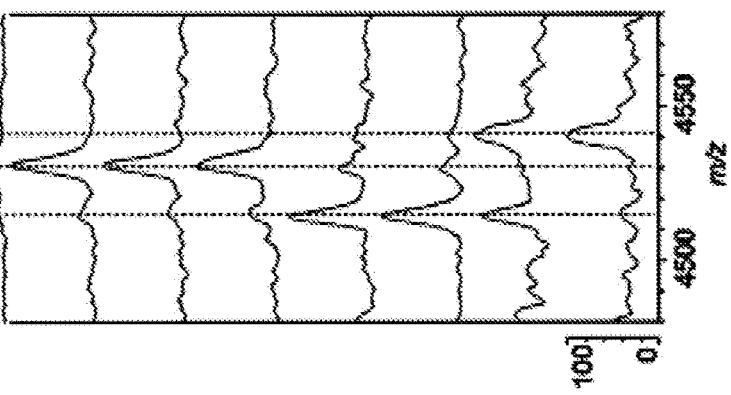
Figure 6:
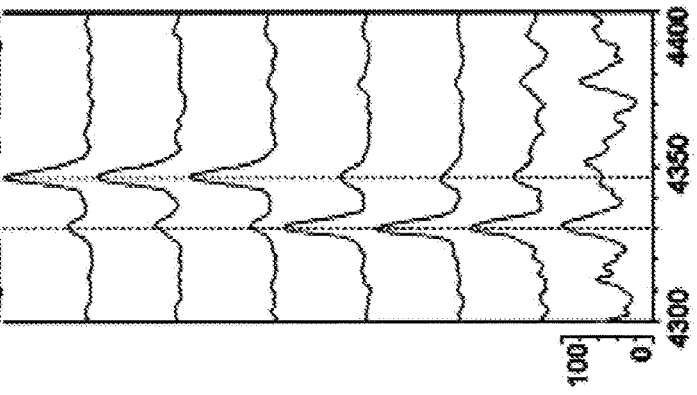
Figure 8:
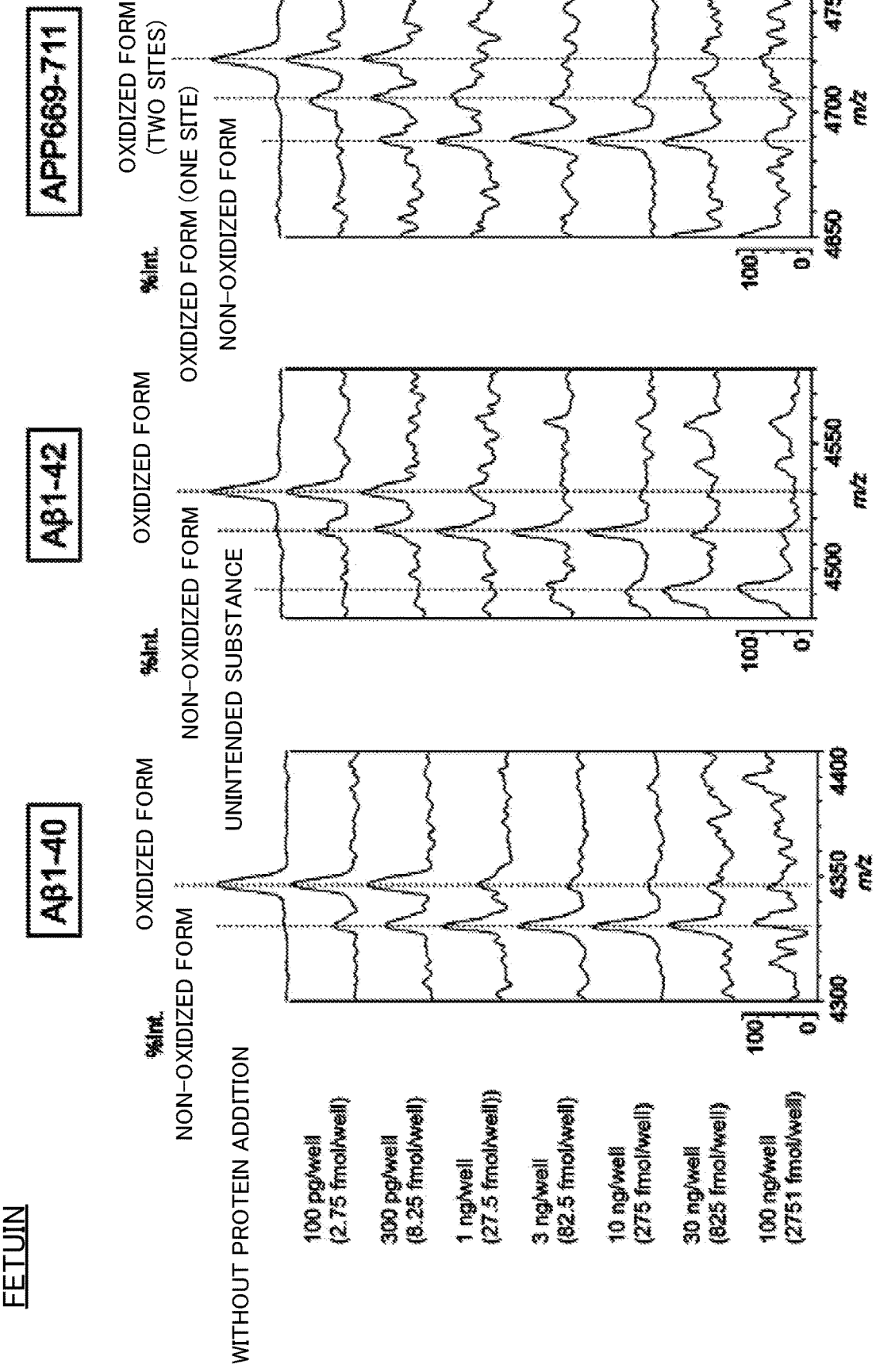
FIG. 8 shows peaks of peptides in mass spectra at varying concentrations of fetuin.

FIGS. 4, 6, and 8 show peaks of peptides in mass spectra at varying concentrations of proteins, namely BSA, transferrin, and fetuin, respectively. By analysis of each of the peptides (at concentration of 500 amol/µL for each) without protein addition ("WITHOUT PROTEIN ADDITION" in each figure), a peak of an oxidized form in each of Aβ1-40 and Aβ1-42 and a peak of two oxidized forms ("OXIDIZED FORM (TWO SITES)" in each figure) in APP669-711 were prominently detected (FIGS. 4, 6, and 8).

In the samples containing each protein at concentrations of 0.1, 0.3, 1, 3, 10, 30, and 100 ng/µL, the oxidation of each peptide was inhibited with the main peak being the non-oxidized form as the amount of each protein was increased. In the case of adding each protein at a concentration of 0.1, 0.3, 1, 3, 10, 30, and 100 ng/µL, the protein is present on the sample plate at 0.1, 0.3, 1, 3, 10, 30, and 100 ng/well, respectively. The effect of inhibiting oxidation was observed for all of the proteins used, i.e. BSA, transferrin, and fetuin. However, at the higher amount of the protein added, the peaks of the non-oxidized forms were smaller. This is considered because ion suppression occurs by the excessive amount of the protein added. Moreover, if the excessive amount of the protein is added, an intensive peak (unintended substance peak) of the protein-derived unintended substances is detected. In this example, the m/z value of the unintended substance peak was different from that of the peak of the target peptide, but if the m/z values of these two peaks are close, and these two peaks overlap, the specificity of the target peptide is reduced. In view of this point, it is preferable that the type of protein to be added is selected appropriately according to the m/z value of the peak of the target peptide.

The peak intensity of the non-oxidized form was higher than that of the oxidized form. For BSA, the range of the amount of protein showing clear peaks was 3 to 10 ng/well (corresponding to 45.2 to 151 fmol/well), and 3 to 10 ng/µL (corresponding to 45.2 to 151 nM) as a concentration at the time of adding the sample solution on the sample plate dropwise. For transferrin, the range mentioned above was 3 to 10 ng/well (corresponding to 39.9 to 133 fmol/well), and 3 to 10 ng/µL (corresponding to 39.9 to 133 nM) as a concentration at the time of adding the sample solution on the sample plate dropwise. For fetuin, the range mentioned above was 1 to 10 ng/well (corresponding to 27.5 to 275 fmol/well), and 1 to 10 ng/µL (corresponding to 27.5 to 275 nM) as a concentration at the time of adding the sample solution on the sample plate dropwise. When compared by weight (g), fetuin was found to inhibit oxidation even at the amount added of 1 ng/well, which was three times as low as the others. When compared by the amount of substance (mol), the lower limit of the amount of substance (mol) with the effect of inhibiting the oxidation was 45.2 fmol/well for BSA, 39.9 fmol/well for transferrin, and 27.5 fmol/well for fetuin, which were close to one another. In other words, the effect of inhibiting the oxidation is considered depending more on the amount of substance (mol) than on the weight (g). On the other hand, the range of the amounts of proteins with unclear peak shapes was 30 ng/well or more for all of BSA, transferrin, and fetuin. Thus, ion suppression is considered depending on the weight (g). Based on these data, the amount of protein added to inhibit the oxidation is suitably 27.5 to 275 fmol/well (27.5 to 275 nM).

Figure 5:
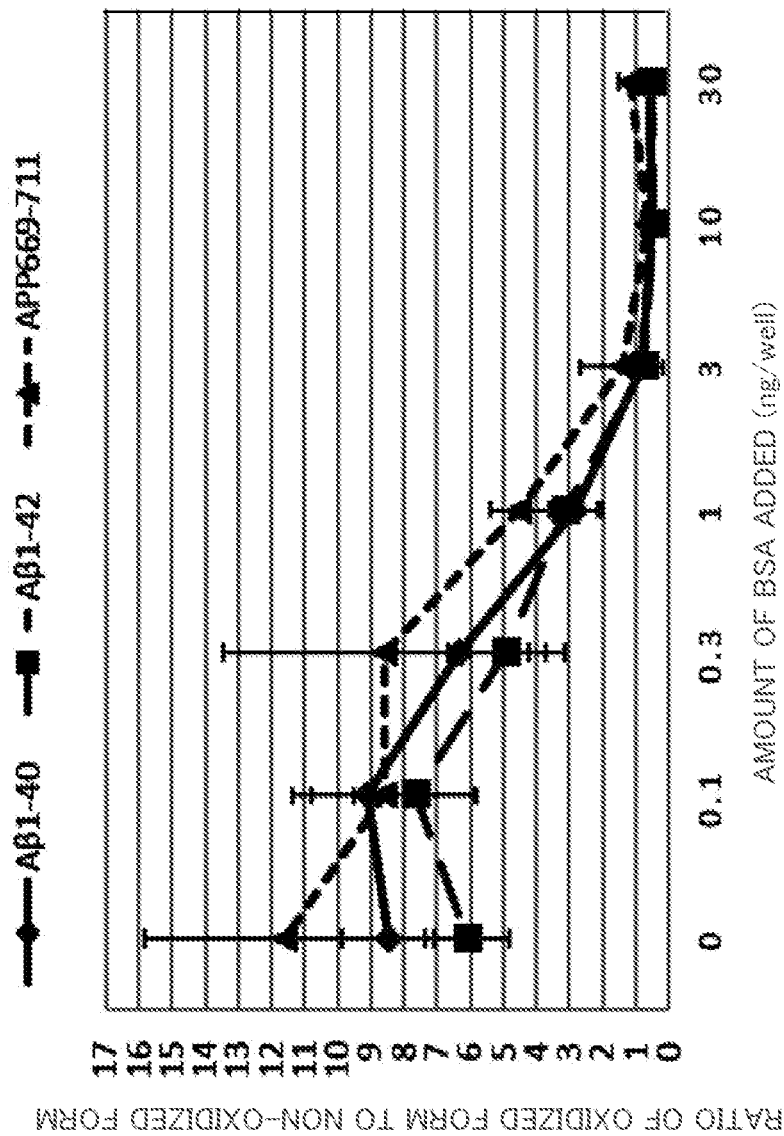
FIG. 5 is a graph showing a relationship between the amount of BSA added to each sample and the ratio of an oxidized form to a non-oxidized form of each peptide based on the mass spectra.
Figure 7:
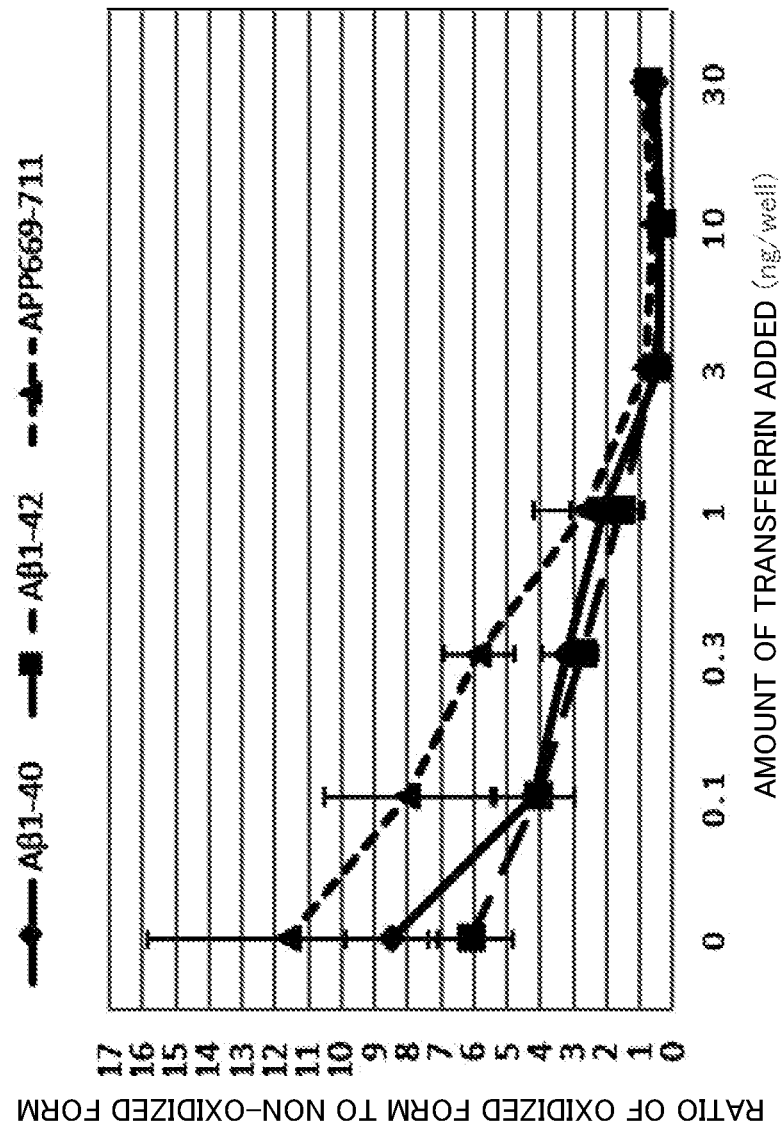
FIG. 7 is a graph showing a relationship between the amount of transferrin added to each sample and the ratio of an oxidized form to a non-oxidized form of each peptide based on the mass spectra.
Figure 9:
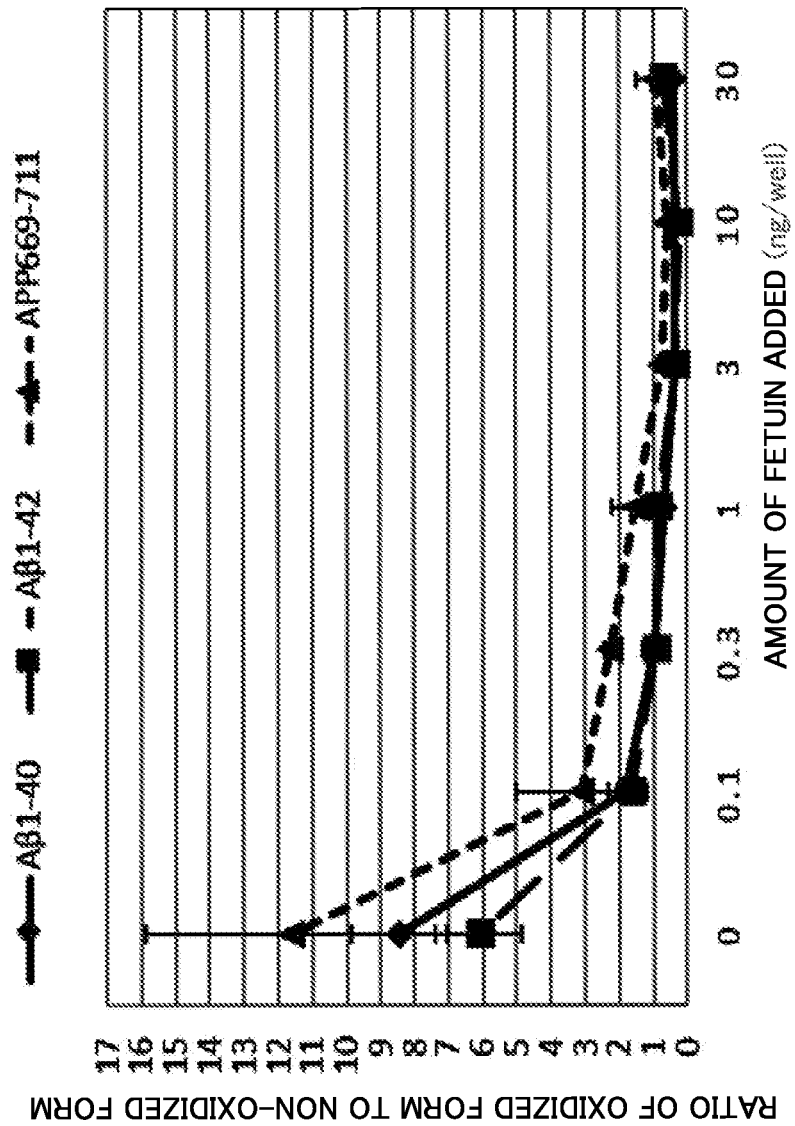
FIG. 9 is a graph showing a relationship between the amount of fetuin added to each sample and the ratio of an oxidized form to a non-oxidized form of each peptide based on the mass spectra.

FIGS. 5, 7, and 9 are graphs showing the respective relationships between the amounts of BSA, transferrin, and fetuin added to each sample and the ratio of an oxidized form to a non-oxidized form of each peptide based on the mass spectra. In samples containing no protein, the peak intensity of the oxidized form was 8.5 times as high as that of the non-oxidized form for Aβ1-40, 6.1 times as high as that of the non-oxidized form for Aβ1-42, and a value of the sum of the peak intensities of the oxidized forms (single oxidized form (one site)) and double oxidized form (oxidized form (two sites)) was 11.6 times as high as that of the non-oxidized form for APP669-711. On the other hand, the ratio of the oxidized form to the non-oxidized form decreased with the addition of the protein, and was reduced by 96% at maximum. These results demonstrate that the addition of proteins to the samples is effective for inhibiting oxidation, and the use of various proteins is effective.

Second Embodiment

The analysis method according to the second embodiment is for inhibiting oxidation of methionine of peptide in a sample by adding, as an antioxidizing agent, an amino acid and/or reducing agent in addition to protein, to a sample to be subjected to mass spectrometry.

Figure 10:
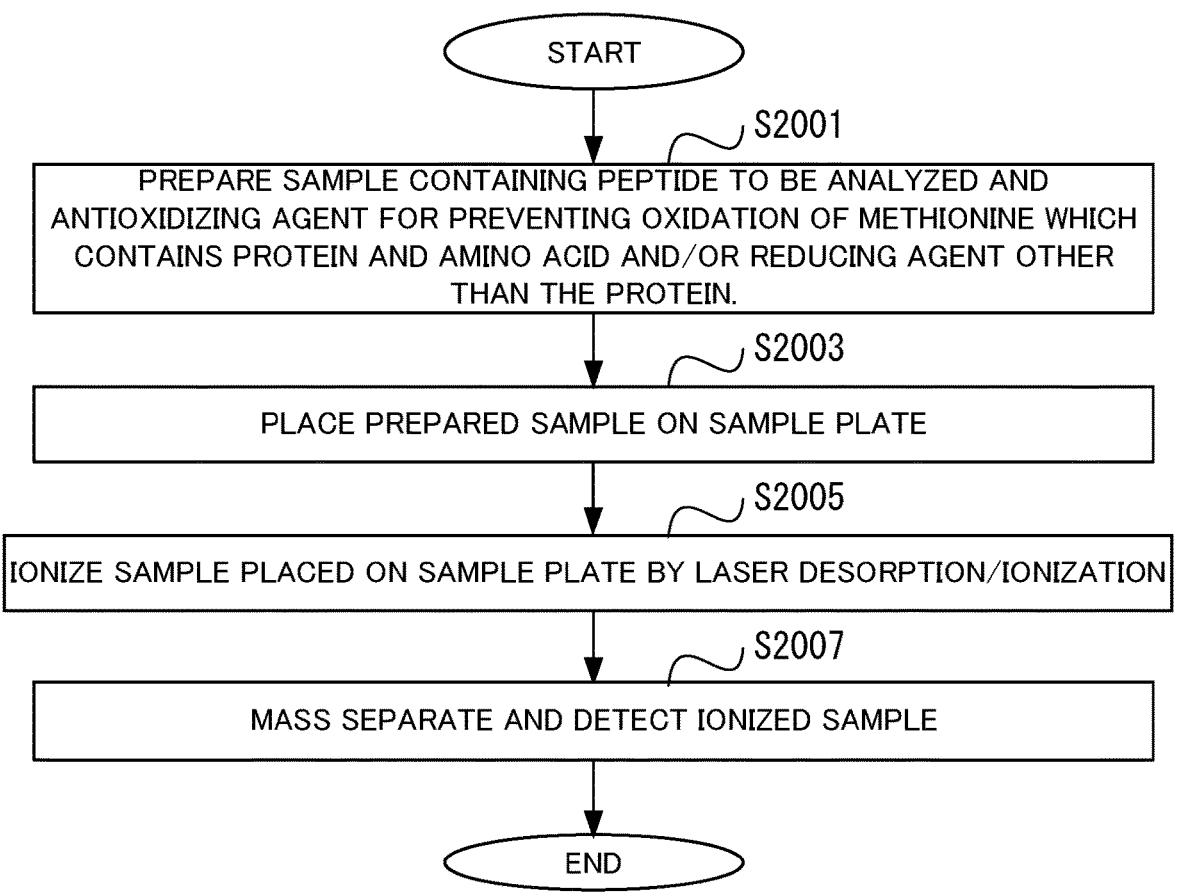
FIG. 10 is a flowchart illustrating flow of an analysis method according to a second embodiment.

FIG. 10 is a flowchart illustrating flow of the analysis method according to this embodiment. In the step S2001, a sample containing a peptide to be analyzed (target peptide) and an antioxidizing agent which contains a protein and an amino acid (free amino acid) and/or reducing agent other than the protein, for preventing oxidation of methionine is prepared. The target peptide may have an amino acid sequence which has been identified entirely or partially and may contain methionine or may have an unknown amino acid sequence. The number of residues in the amino acid sequence of the target peptide is not particularly limited, and is 100 or less, preferably 50 or less as in each peptide used in the example.

The kind of the protein (antioxidative protein) contained in the antioxidizing agent is not particularly limited. As in the case of the first embodiment, it is considered that since the sample contains, besides the target peptide, a molecule to be easily oxidized, targets to be oxidized are dispersed therein, thereby preventing oxidation of the target peptide.

More specifically, in the step S2001, the antioxidative protein is added to a solution (sample solution) containing the target peptide to have a predetermined concentration. The concentration of the antioxidative protein is not particularly limited, but is desirably in the range of the concentration, amount of substance, or mass preferred in the first embodiment in terms of promoting the prevention of oxidation by the antioxidative protein.

The antioxidizing agent according to this embodiment contains, in addition to the antioxidative protein, an amino acid and/or reducing agent. The amino acid and/or reducing agent is preferably a low-molecular-weight compound, and the molecular weight of the low-molecular-weight compound is preferably less than 10000, more preferably less than 5000. The molecular weight of the low-molecular-weight compound is preferably smaller than that of the antioxidative protein. It is considered that the presence of a low-molecular-weight compound which captures oxygen in a sample solution inhibits oxidation of target peptide, which cannot be prevented by the antioxidative protein only. Hereinafter, a free amino acid and/or reducing agent contained in the antioxidizing agent in this embodiment is referred to as a low-molecular-weight oxygen-capturing substance.

The concentration of the low-molecular-weight oxygen-capturing substance is preferably 0.001 mM or more, more preferably 0.01 mM or more, yet more preferably 0.1 mM or more. The amount of substance of the low-molecular-weight oxygen-capturing substance in each well is preferably 1 pmol/well or more, more preferably 10 pmol/well or more, yet more preferably 100 pmol/well or more. The higher the concentration or amount of the low-molecular-weight oxygen-capturing substance is, the higher the effect of preventing oxidation of the target peptide becomes, which is preferable.

The concentration of the low-molecular-weight oxygen-capturing substance is preferably less than 10 mM, more preferably less than 1 mM. The amount of substance of the low-molecular-weight oxygen-capturing substance in each well is preferably less than 10 nmol/well, more preferably less than 1 nmol/well. If the concentration or amount of the low-molecular-weight oxygen-capturing substance is too high, ion suppression or the like may occur and the sensitivity of mass spectrometry may decrease, which is undesirable.

The amino acids in the low-molecular-weight oxygen-capturing substance are preferably at least one of methionine, histidine, cysteine and tryptophan each of which has a side chain which is easily oxidized. The side chains of these amino acids receive oxygen, which causes the oxidation targets in the sample solution to be dispersed and makes the target peptide less likely to be oxidized.

The reducing agent in the low-molecular-weight oxygen-capturing substance is preferably a low-molecular-weight compound as mentioned above, but is not particularly limited, and is preferably at least one compound selected from the group consisting of dithiothreitol (DTT), tris(2-carboxyethyl)phosphine (TCEP), 2-mercaptoethanol (2-ME), tri-n-butylphosphine (TBP), dithioerythritol (DTE), ascorbic acid, polyphenol, sodium pyrosulfite, citric acid, glucose, carotene, thio-glycolic acid, thio-glycolic acid, N-acetylcysteine, hydroxylamine, reduced glutathione, 2-aminoethyl isothiouronium bromide, and thioglycerol. Among them, polyphenol is particularly preferably catechin, isoflavone, ellagic acid, or tannin.

Further, a solution (additive-containing matrix solution) containing a matrix and a matrix additive is prepared. The kind of the matrix is not particularly limited, and, for example, CHCA, DHB, or sinapic acid can be used. The kind of the matrix additive is not particularly limited, and for example, MDPNA can be used. After the step S2001, the step S2003 is started.

In the step S2003, the sample prepared in the step S2001 is placed on a sample plate for mass spectrometer. The additive-containing matrix solution placed in each well of the sample plate is dried, and a sample solution containing an antioxidative protein and an amino acid and/or reducing agent added was then added to the dried matrix and thereafter dried. As the sample plate, a sample plate for use in laser desorption/ionization, particularly MALDI is preferable. After the step S2003, the step S2005 is started.

It should be noted that how to prepare a sample to be subjected to mass spectrometry is not limited to this, and for example, a solution containing target peptide, an antioxidative protein, an amino acid and/or reducing agent, a matrix, and a matrix additive may be prepared, and this solution may be placed on a sample plate and dried.

The steps S2005 to S2007 are the same as the steps S1005 to S1007, respectively, and the description thereof are thus omitted. After the step S2007, the process is completed.

Figure 11:
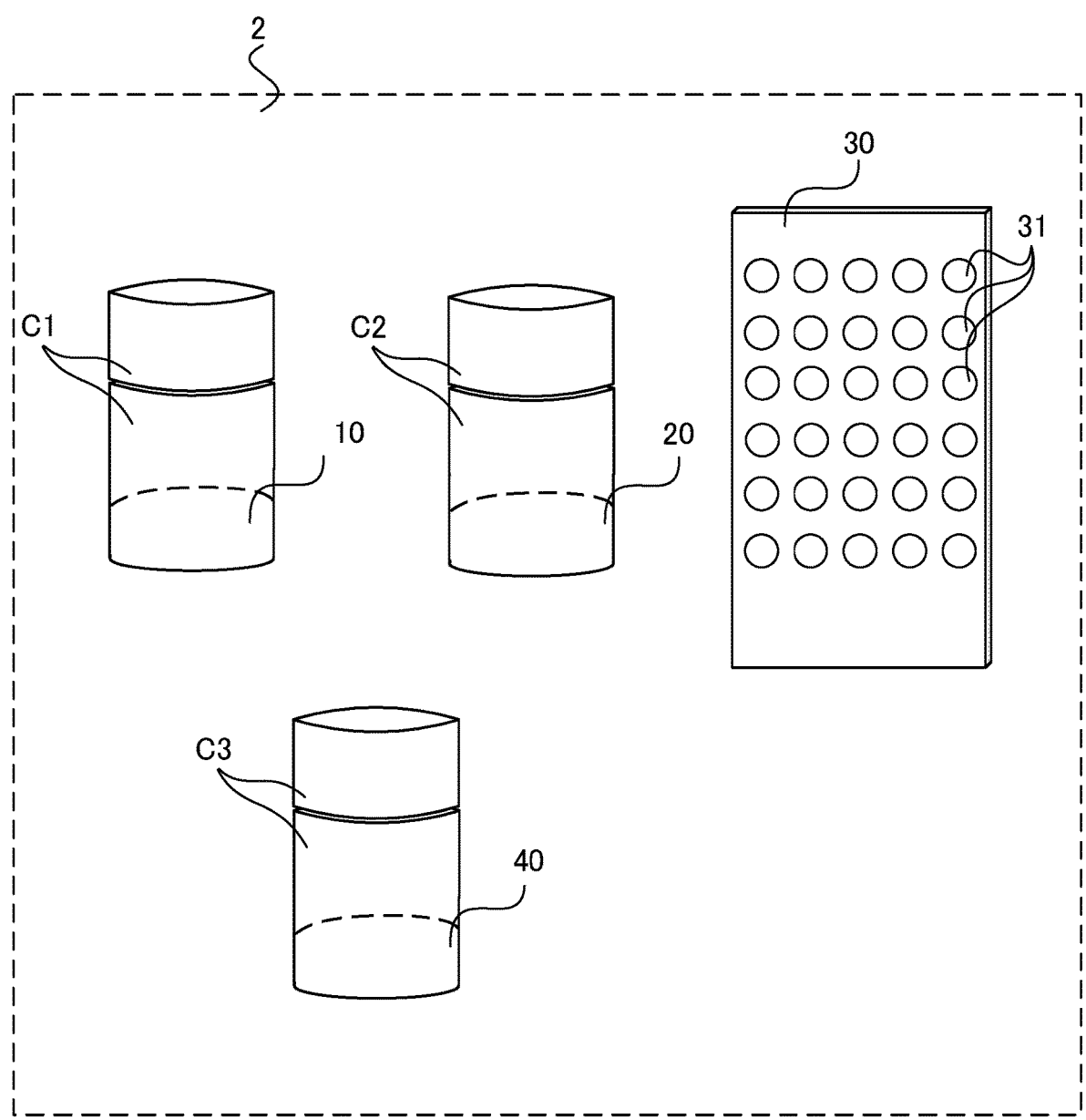
FIG. 11 is a schematic view illustrating a kit for use in mass spectrometry according to the second embodiment.

FIG. 11 is a schematic view illustrating a kit for use in mass spectrometry for providing reagents and the like used in the analysis method according to this embodiment.

The kit for use in mass spectrometry 2 according to this embodiment includes an antioxidative protein 10, a matrix 20, a sample plate 30, and a low-molecular-weight oxygen-capturing substance 40 containing an amino acid and/or reducing agent.

The antioxidative protein 10 and the low-molecular-weight oxygen-capturing substance 40 are used for preparation of a sample to be ionized by laser desorption/ionization, particularly MALDI, and is a peptide antioxidizing agent for use in mass spectrometry, which prevents oxidation of methionine in a target peptide. The matrix 20 includes a matrix such as CHCA, DHB, or sinapic acid mentioned above. The matrix 20 may be in a solid state or a state of being dissolved in any solvent including water and/or acetonitrile or the like. In FIG. 11, the antioxidative protein 10, the matrix 20, and the low-molecular-weight oxygen-capturing substance 40 are stored in containers C1, C2, and C3, respectively, and the kinds, shapes, and the like of the containers C1, C2, and C3 are not particularly limited. The sample plate 30 is for laser desorption/ionization and has a plurality of wells 31 formed thereon. The shapes, number, positions for arrangement and the like of the wells 31 are not particularly limited.

It should be noted that the kit for use in mass spectrometry according to this embodiment is required to contain at least the low-molecular-weight oxygen-capturing substance 40, may not contain the antioxidative protein 10, the matrix 20, and the sample plate 30, and may contain one, two, or all of them.

Example of Second Embodiment

The following shows an example according to this embodiment, but the present invention is not to be limited by the example. In the example of the first embodiment, sample solutions obtained by adding 0.1, 0.3, 1, 3, 10, 30, or 100 ng/µL BSA to a mixture of Aβ1-40, Aβ1-42, and APP669-711 were prepared, and subjected to mass spectrometry, to determine inhibition of oxidation of the peptides (see FIG. 4). In the below example, an amino acid and/or reducing agent was further added to these sample solutions, to evaluate inhibition of oxidation of the peptides.

2-1. Evaluation of Inhibition of Oxidation of Peptide by Antioxidative Protein and Amino Acid A sample solution obtained by adding 10 ng/µL BSA as well as an amino acid to a mixture of three kinds of synthetic peptides Aβ1-40, Aβ1-42, and APP669-711 (see example of the first embodiment) and a sample solution obtained by adding 10 ng/µL BSA and not adding an amino acid to the mixture were prepared. As a solvent, 70% (v/v) acetonitrile containing 5 mM hydrochloric acid was used. The amino acid-containing sample solution contained any of glycine (NACALAI TESQUE), L-methionine (NACALAI TESQUE), L-cysteine (Thermo Fisher Scientific), and L-histidine (Fluka). As mentioned above, methionine, cysteine, and histidine have side chains having a site to be easily oxidized, but glycine does not have a side chain having a site to be easily oxidized. Thus, glycine was used in a comparative example. The concentrations of the amino acid added were 0.0001, 0.001, 0.01, 0.1, 1, and 10 mM. These samples were subjected to MALDI-TOF MS under the same conditions as in the example of the first embodiment.

Figure 12:
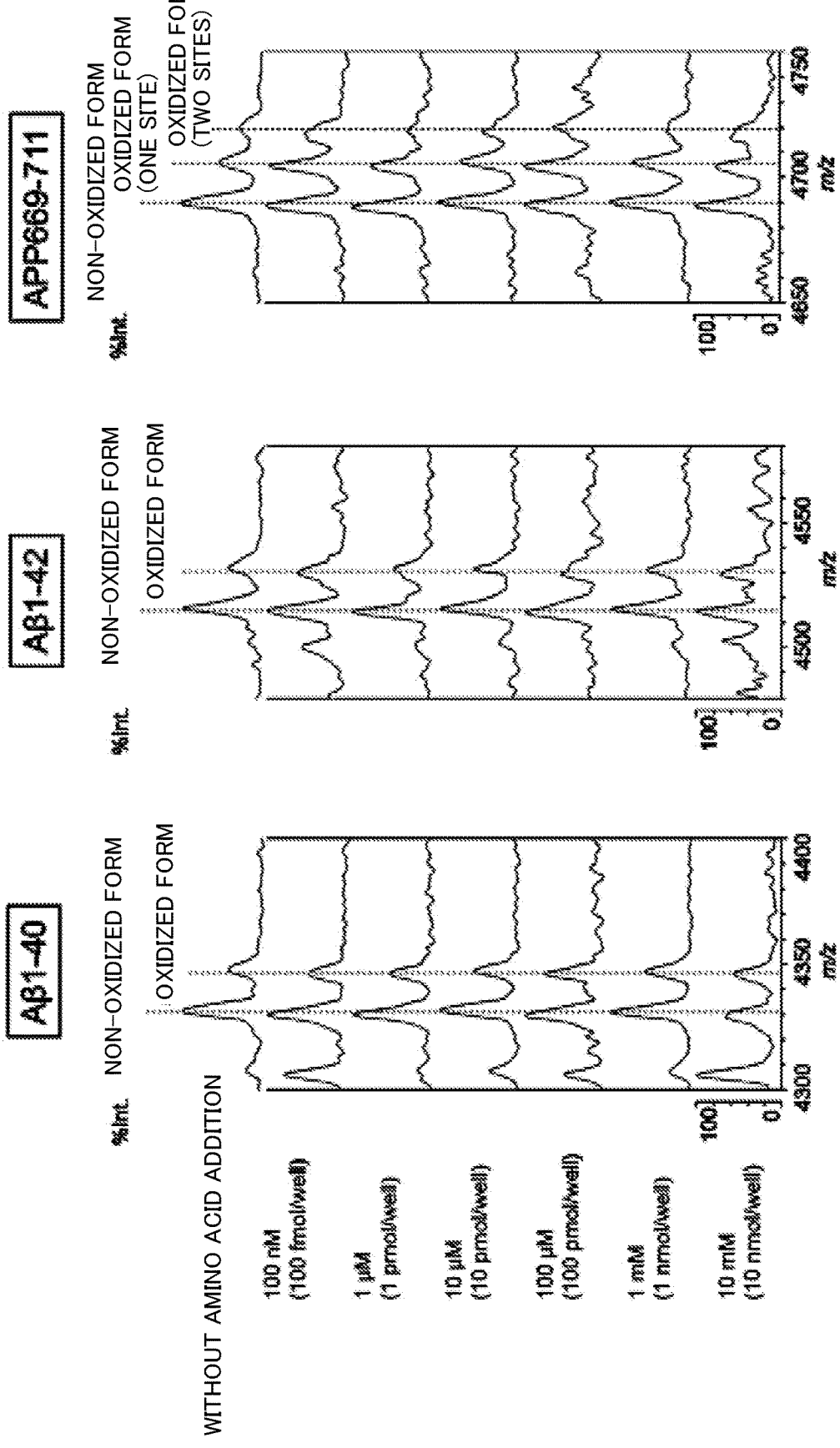
FIG. 12 shows peaks of peptides in mass spectra at varying concentrations of glycine.
Figure 13:
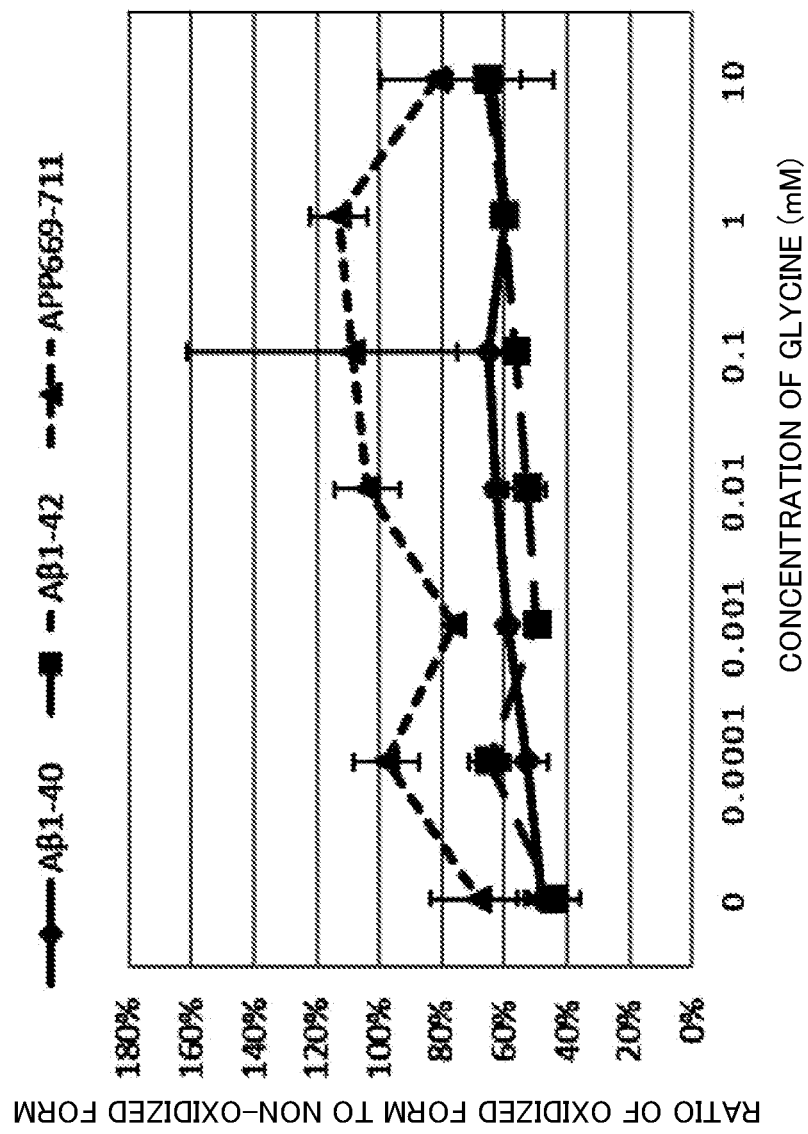
FIG. 13 is a graph showing a relationship between the concentration of glycine added to each sample and the ratio of an oxidized form to a non-oxidized form of each peptide based on the mass spectra.

FIG. 12 shows peaks of peptides in mass spectra at varying concentrations of glycine. FIG. 13 is a graph showing a relationship between the concentration of glycine added to each sample and the ratio of an oxidized form to a non-oxidized form of each peptide based on the mass spectra. The addition of glycine to the sample solution at various concentrations in addition to BSA did not change the peak of the oxidized form. That is, the effect of inhibiting oxidation of peptide by glycine was not confirmed.

Figure 14:
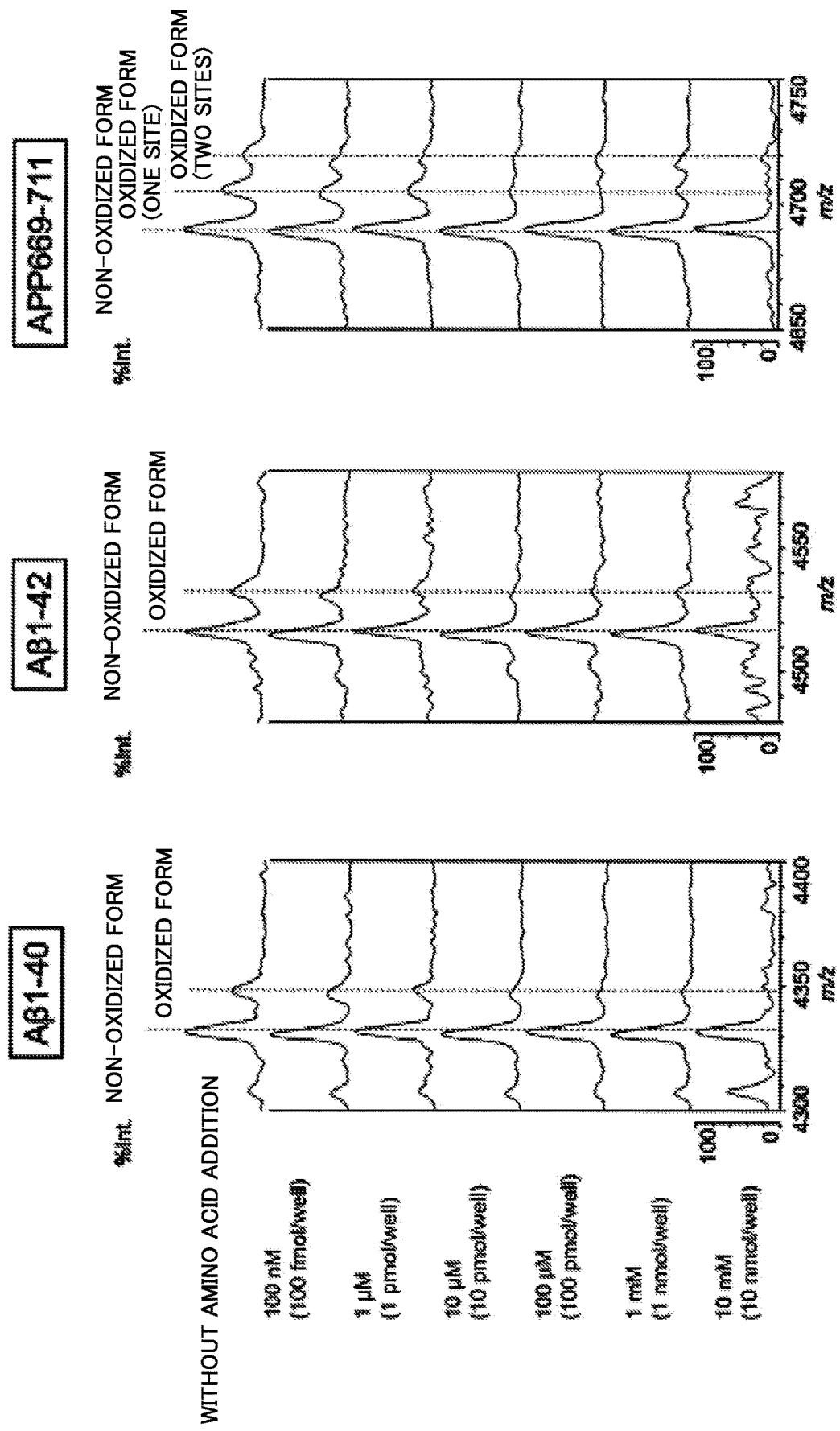
FIG. 14 shows peaks of peptides in mass spectra at varying concentrations of L-methionine.
Figure 15:
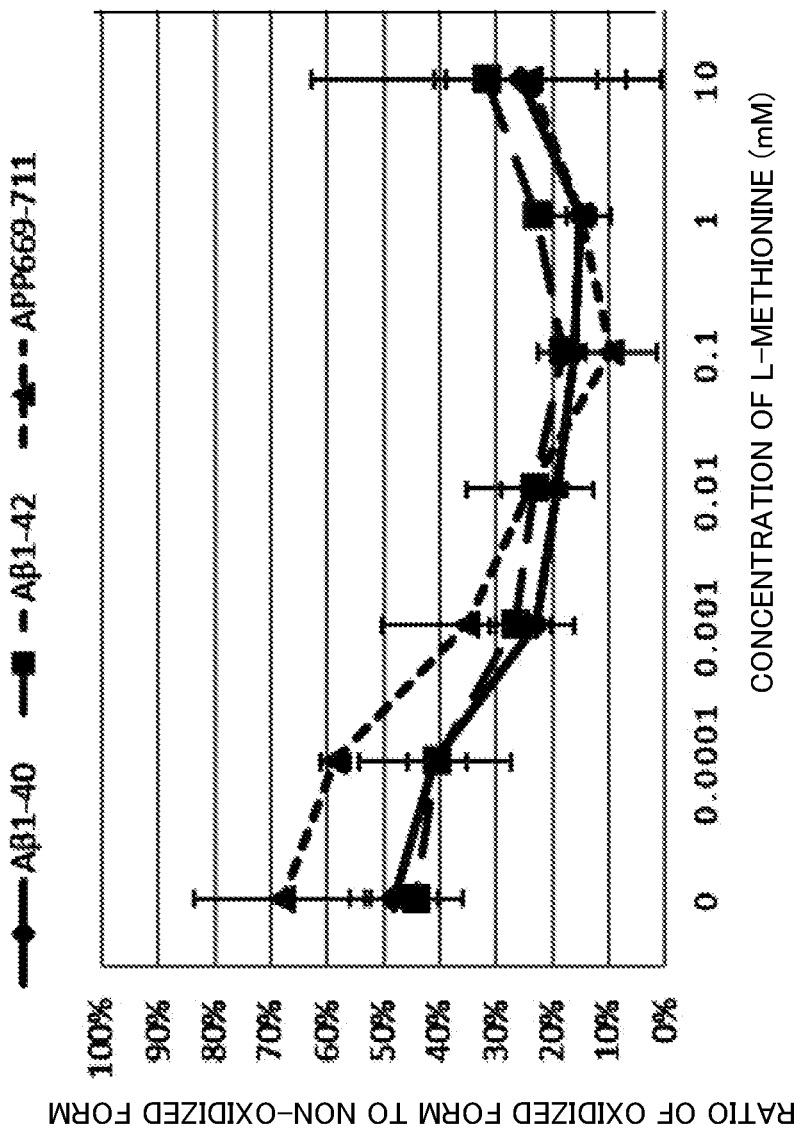
FIG. 15 is a graph showing a relationship between the concentration of L-methionine added to each sample and the ratio of an oxidized form to a non-oxidized form of each peptide based on the mass spectra.
Figure 16:
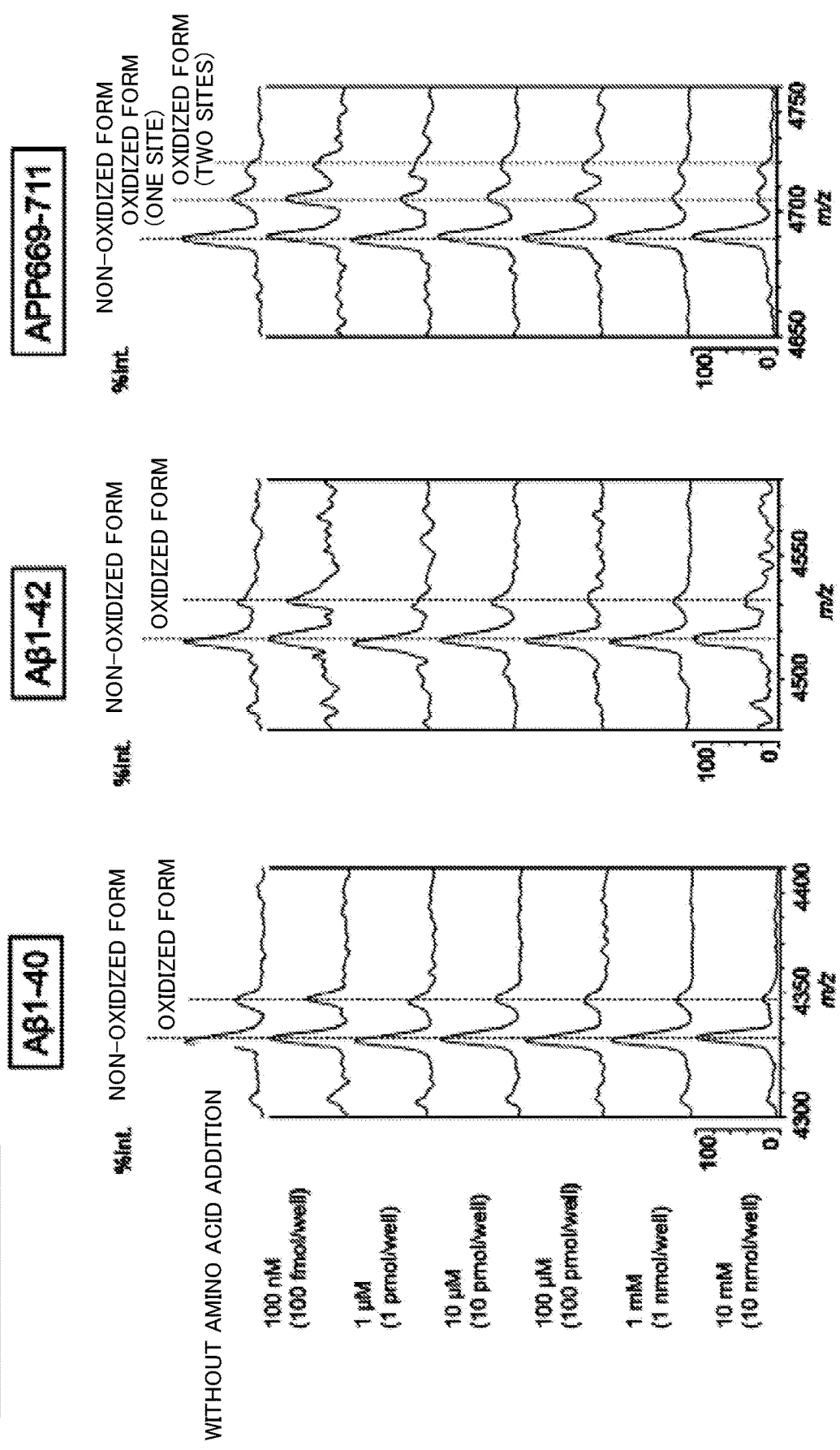
FIG. 16 shows peaks of peptides in mass spectra at varying concentrations of L-cysteine.
Figure 17:
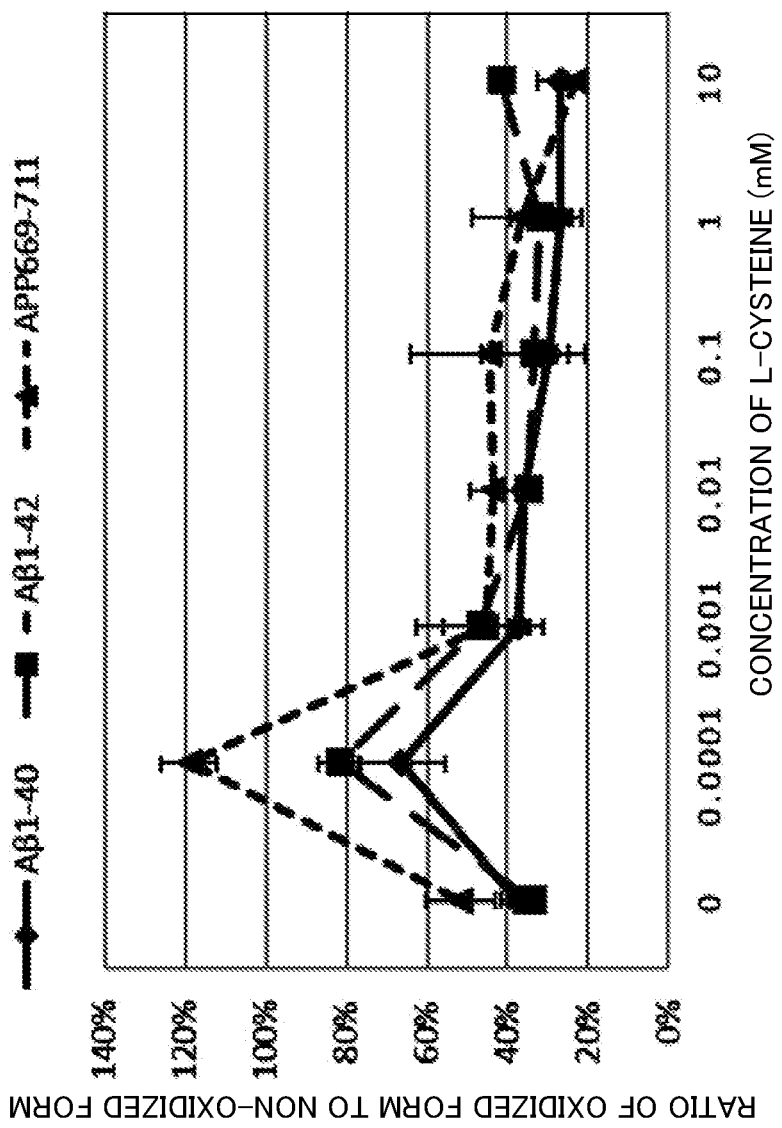
FIG. 17 is a graph showing a relationship between the concentration of L-cysteine added to each sample and the ratio of an oxidized form to a non-oxidized form of each peptide based on the mass spectra.
Figure 18:
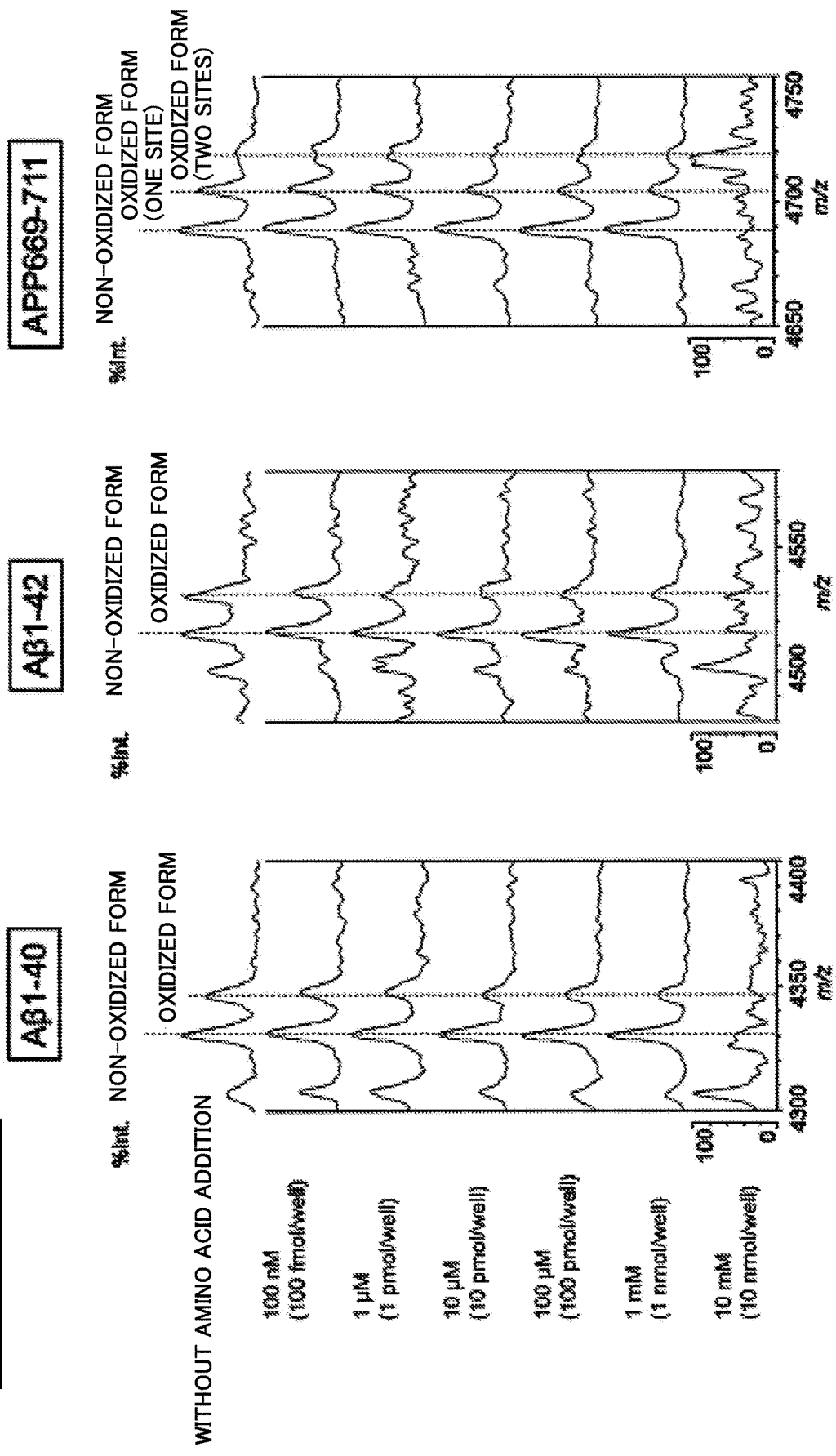
FIG. 18 shows peaks of peptides in mass spectra at varying concentrations of L-histidine.
Figure 19:
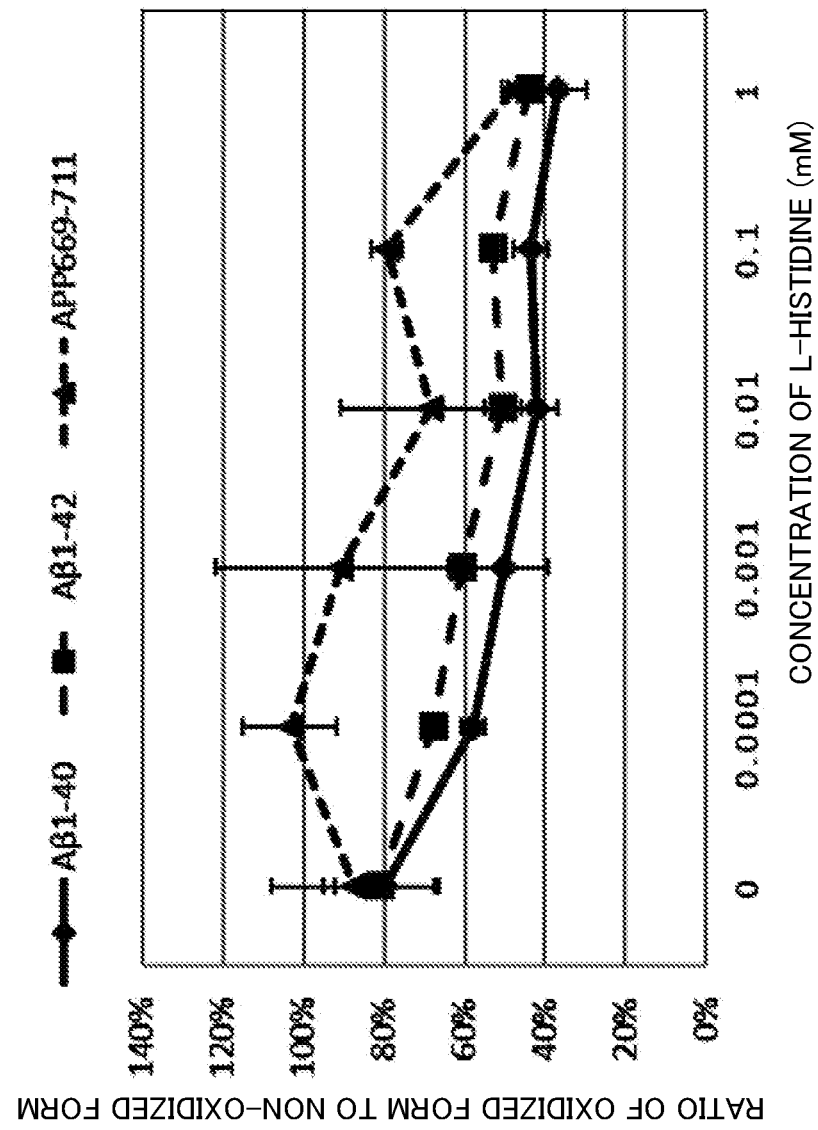
FIG. 19 is a graph showing a relationship between the concentration of L-histidine added to each sample and the ratio of an oxidized form to a non-oxidized form of each peptide based on the mass spectra.

FIGS. 14, 16, and 18 show peaks of peptides in mass spectra at varying concentrations of L-methionine, L-cysteine, and L-histidine, respectively. FIGS. 15, 17, and 19 are graphs showing the respective relationships between the concentrations of L-methionine, L-cysteine, and L-histidine added to each sample and the ratio of an oxidized form to a non-oxidized form of each peptide based on the mass spectra. In each of the cases in which L-methionine, L-cysteine, and L-histidine were added to the sample solutions, the peak of the oxidized form became smaller, and the ratio of the peak intensity of the oxidized form to that of the non-oxidized form became lower.

Inhibition of oxidation was evaluated by Dunnett's test with a significance level of $p<0.05$. The concentrations of amino acids, which had a statistically significant reduction in the ratio of the oxidized form of at least one of the three peptides compared to the control containing no amino acid were 0.001 to 10 mM for L-methionine, 10 mM for L-cysteine, and 0.01 to 10 mM for L-histidine. For glycine, no statistically significant reduction of the number of the oxidized forms was confirmed. The concentrations with the greatest effect of inhibiting the oxidation were 100 µM or 1 mM for L-methionine, 1 mM or 10 mM for L-cysteine, and 1 mM for L-histidine. As for L-histidine, the ion suppression occurs strongly at a high concentration of 10 mM, and no peak was detected. Even in the case of L-methionine and L-cysteine, the sensitivity tended to decrease at the concentrations of 10 mM. A common feature of the amino acids that inhibited oxidation is that they have side chains that are susceptible to oxidation. That is, it is considered that oxidation of the target peptide is inhibited by capturing oxygen by side chains.

2-2. Evaluation of Inhibition of Oxidation of Peptide by Antioxidative Protein and Reducing Agent A sample solution obtained by adding 10 ng/µL BSA as well as DTT as a reducing agent to a mixture of three kinds of synthetic peptides Aβ1-40, Aβ1-42, and APP669-711 and a sample solution obtained by adding 10 ng/µL BSA and not adding DTT to the mixture. As a solvent, 70% (v/v) acetonitrile containing 5 mM hydrochloric acid was used. The concentrations of DTT added were 0.0001, 0.001, 0.01, 0.1, 1, and 10 mM. These samples were subjected to MALDI-TOF MS under the same conditions as in the case of the amino acid in the section 2-1 described above.

Figure 20:
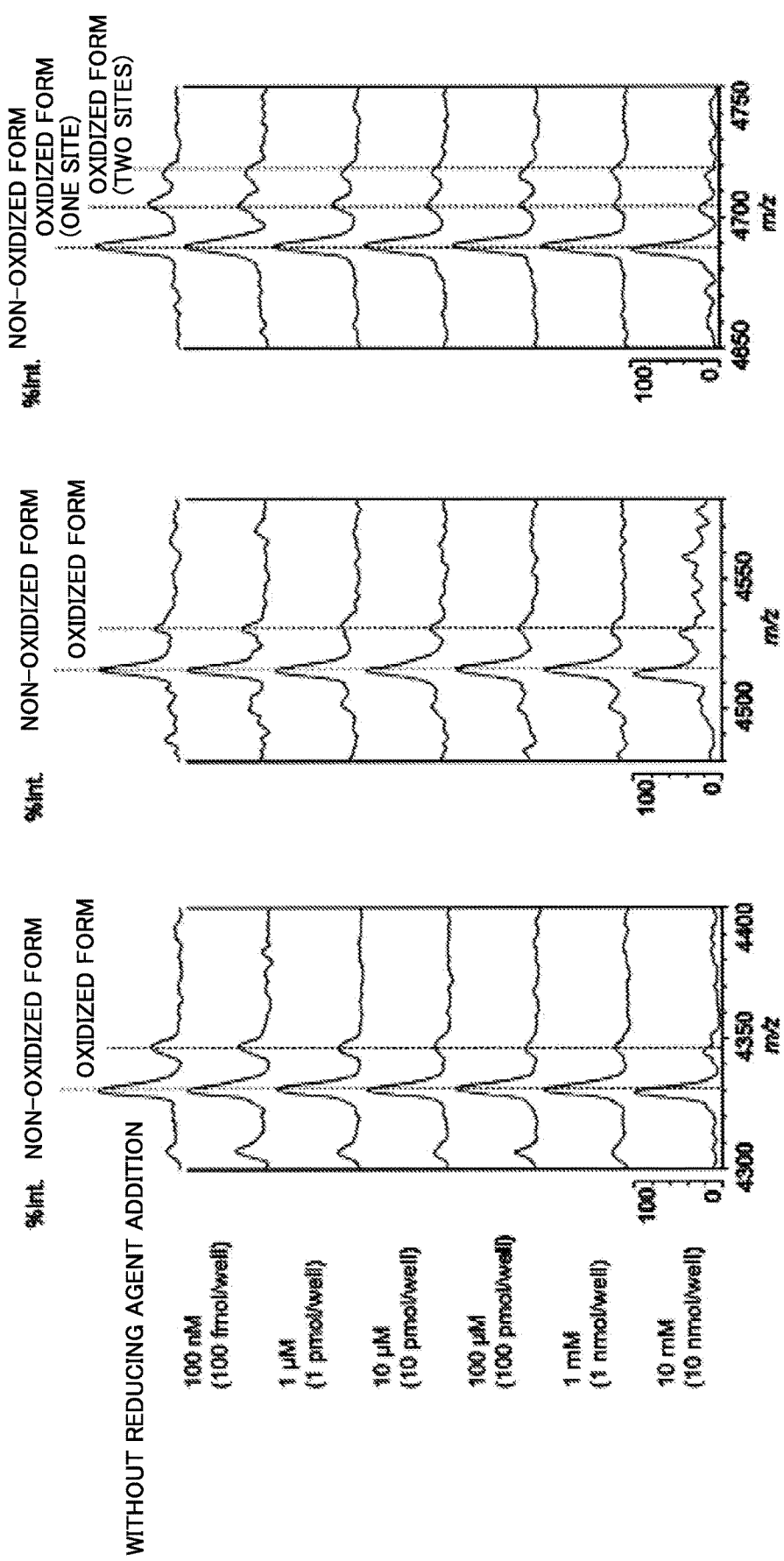
FIG. 20 shows peaks of peptides in mass spectra at varying concentrations of DTT.
Figure 21:
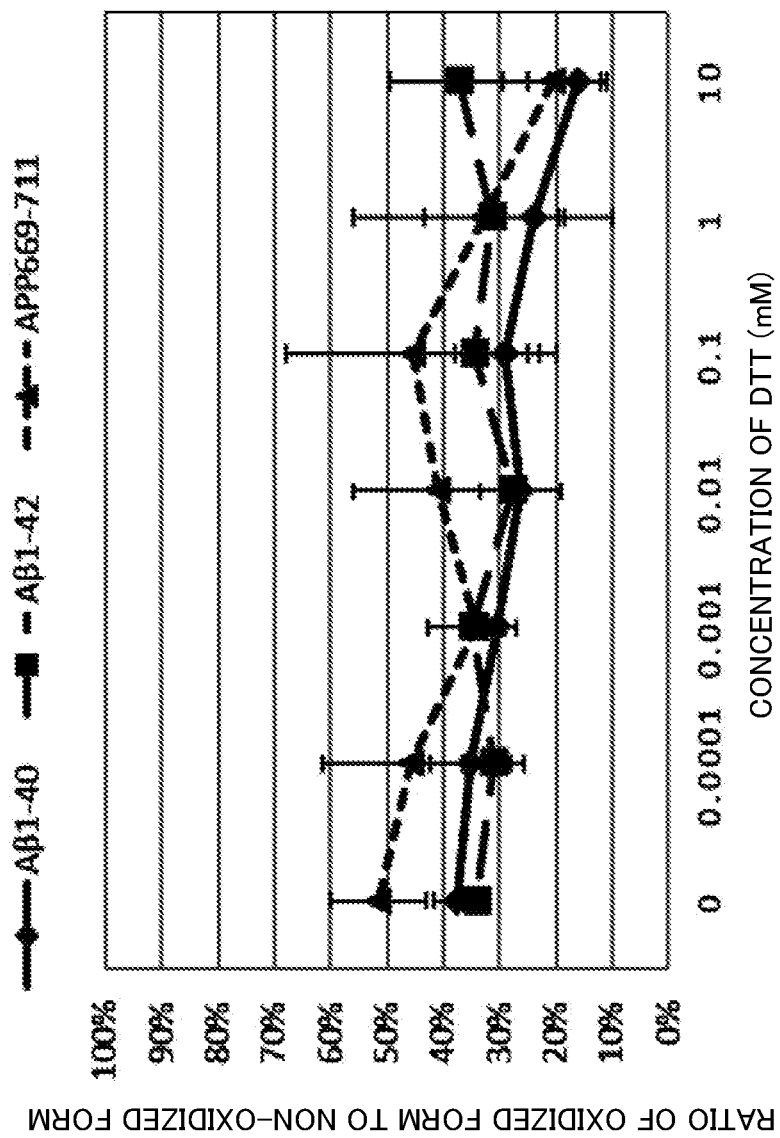
FIG. 21 is a graph showing a relationship between the concentration of DTT added to each sample and the ratio of an oxidized form to a non-oxidized form of each peptide based on the mass spectra.

FIG. 20 shows peaks of peptides in mass spectra at varying concentrations of DTT. FIG. 21 is a graph showing a relationship between the concentration of DTT added to each sample and the ratio of an oxidized form to a non-oxidized form of each peptide based on the mass spectra. If DTT was added to the sample solutions at various concentrations in addition to BSA, the peak intensity of the oxidized form decreased and the ratio of the peak intensity of the oxidized form to that of the non-oxidized form decreased at 10 µM or more.

Inhibition of oxidation was evaluated by Dunnett's test with a significance level of $p<0.05$. The concentration of DTT, which had a statistically significant reduction in the ratio of the oxidized form of at least one of the three peptides compared to the control containing no reducing agent, was 10 mM. The results show that oxidation on the sample plate is inhibited even in the case where a reducing agent is added. The most effective concentration was 10 mM. Also, at the concentration of 10 mM, the sensitivity tended to decrease.

2-3. Evaluation of Oxidation of Peptide by Amino Acid or Reducing Agent in the Absence of Antioxidative Protein in Sample Solution A sample solution obtained by adding 1 mM L-methionine and not adding an antioxidative protein to a mixture of three kinds of synthetic peptides Aβ1-40, Aβ1-42 and APP669-711, a sample solution obtained by adding 10 mM DTT and not adding an antioxidative protein to the mixture, and sample solutions obtained by adding 10 ng/μL BSA to these sample solutions were prepared. As a solvent, 70% (v/v) acetonitrile containing 5 mM hydrochloric acid was used. These samples were subjected to MALDI-TOF MS under the same conditions as in the case of the amino acid in the section 2-1 described above.

Figure 22:
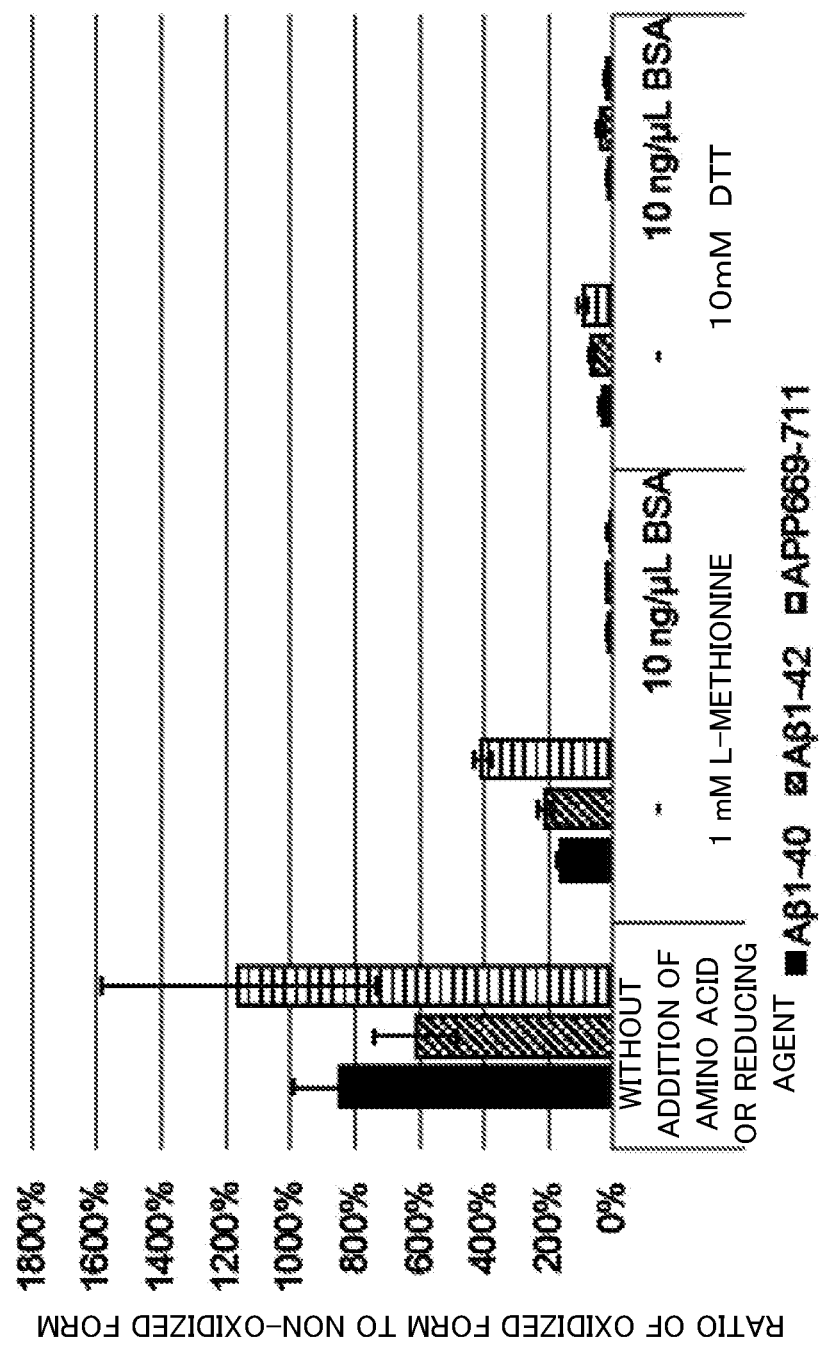
FIG. 22 is a graph showing the ratio of an oxidized form to a non-oxidized form of each peptide based on mass spectra in the case in which BSA is added to each sample containing L-methionine or DTT and in the case in which BSA is not added to the sample.

FIG. 22 is a graph showing the ratio of an oxidized form to a non-oxidized form of each peptide based on mass spectra in the case in which BSA is added to each sample containing L-methionine or DTT and in the case in which BSA is not added to the sample. Even when 1 mM L-methionine or 10 mM DTT was added to the sample solution alone, the ratio of the peak intensity of the oxidized form to that of the non-oxidized form decreased, and an effect of inhibiting the oxidation was observed. Further addition of BSA in addition to these components further reduced the ratio of the peak intensity of the oxidized form to that of the non-oxidized form. This result indicates that the addition of the antioxidative protein to a sample solution containing an amino acid and reducing agent and not containing an antioxidizing agent protein further inhibits the oxidation of peptide.

Third Embodiment

The analysis method according to the third embodiment is to prevent oxidation of methionine in peptides in a sample by adding an amino acid and/or reducing agent as an antioxidizing agent in addition to a protein (antioxidative protein) to a sample to be subjected to mass spectrometry in the same manner as the analysis method according to the second embodiment. In addition, in the analysis method according to this embodiment, the peptide to be analyzed (target peptide) is purified by affinity purification, and in the affinity purification, a ligand contained in an eluent is used as an antioxidative protein. Accordingly, oxidation of the target peptide can be effectively inhibited without an operation of adding an antioxidative protein to a sample solution.

Figure 23:
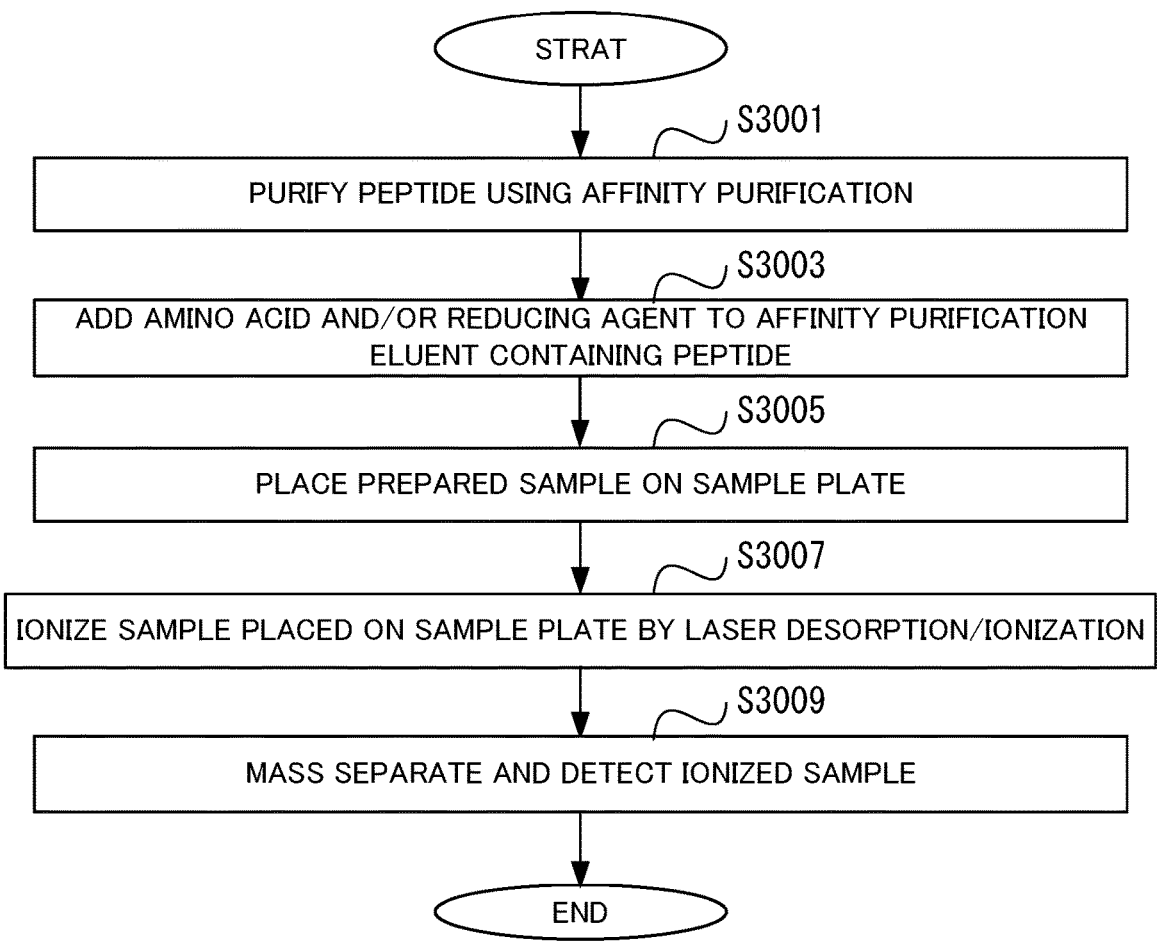
FIG. 23 is a flowchart illustrating flow of an analysis method according to a variation of the second embodiment.

FIG. 23 is a flowchart illustrating flow of the analysis method according to this embodiment. In the step S3001, target peptide is purified using affinity purification. How to perform the affinity purification is not particularly limited as long as a protein can be used as a ligand bonded to a support, and immunoprecipitation (IP), chromatin immunoprecipitation (ChIP), pull-down assay, affinity chromatography or the like can be used. If an antibody is used as a ligand, this antibody may be immobilized on any column including a spin column or the like, or on a pipette tip or microchannel.

In the affinity purification, a peptide solution containing a target peptide is brought to be in contact with a ligand bonded to a support, to bind the target peptide in the peptide solution to the ligand. The kind of the ligand is not particularly limited as long as it can bind to a support and the target peptide, and an antibody which can specifically or nonspecifically bind to the target peptide can be used.

When the target peptide is bonded to the ligand, the support is washed with a buffer solution with the bonding being kept, to remove components in the peptide solution not binding to the ligand. Then, the support is brought to be in contact with an eluent containing a buffer solution or the like having a lower pH or high pH, to elute the target peptide. After the step S3001, the step S3003 is started.

In the step S3003, an amino acid and/or reducing agent is added to the eluent used in the affinity purification, containing the target peptide, to prepare a sample solution. The amino acid and reducing agent used are preferably those used as a low-molecular-weight oxygen-capturing substance in the second embodiment. The sample solution contains the ligand used in the affinity purification. As in the case of the above-described embodiment, it is considered that since the sample contains, besides the target peptide, a molecule to be easily oxidized, targets to be oxidized are dispersed therein, thereby preventing oxidation of the target peptide.

It should be noted that in the affinity purification, the amino acid and reducing agent as the low-molecular-weight oxygen-capturing substance may be added to the eluent in advance. This allows a sample solution in which the oxidation of the target peptide is inhibited to be prepared without the need for the addition of a low-molecular-weight oxygen-capturing substance after elution.

The concentration of the low-molecular-weight oxygen-capturing substance in this embodiment is preferably 0.0001 mM or more, more preferably 0.00067 mM or more, yet more preferably 0.0067 mM or more, even more preferably 0.067 mM or more. The higher the concentration of the low-molecular-weight oxygen-capturing substance is, the higher the effect of preventing oxidation of the target peptide becomes, which is preferable. The concentration of the low-molecular-weight oxygen-capturing substance in this embodiment is preferably less than 10 mM, more preferably less than 1 mM. If the concentration of the low-molecular-weight oxygen-capturing substance is too high, ion suppression or the like may occur and the sensitivity of mass spectrometry may decrease, which is undesirable.

Further, a solution (additive-containing matrix solution) containing a matrix and a matrix additive is prepared. The kind of the matrix is not particularly limited, and, for example, CHCA, DHB, or sinapic acid can be used. The kind of the matrix additive is not particularly limited, and for example, MDPNA can be used. After the step S3003, the step S3005 is started.

In the step S3005, the sample prepared in the step S3003 is placed on a sample plate for mass spectrometer. The additive-containing matrix solution placed in each well of the sample plate is dried, and a sample solution containing the above ligand as an antioxidative protein and an amino acid and/or reducing agent added was then added to the dried matrix and thereafter dried. After the step S3005, the step S3007 is started.

It should be noted that how to prepare a sample to be subjected to mass spectrometry is not limited to this, and for example, a solution containing target peptide, the above ligand, an amino acid and/or reducing agent, a matrix, and a matrix additive may be prepared, and this solution may be placed on a sample plate and dried.

The steps S3007 to S3009 are the same as the steps S1005 to S1007, respectively, and the description thereof are thus omitted. After the step S3009, the process is completed.

Example of Third Embodiment

The following shows an example according to this embodiment, but the present invention is not to be limited by the example.

3-1. Immunoprecipitation (IP)

An anti-Aβ antibody (clone 6E10) was bonded to Epoxy magnetic beads (Thermo Fisher Scientific) to prepare anti-Aβ antibody beads for immunoprecipitation. Samples were prepared by adding synthetic peptides Aβ1-40 (40 μM), Aβ1-42 (10 μM) and APP669-711 (10 μM) to human plasma. 250 μL of the plasma spiked with the synthetic peptides (target peptides) were mixed with 250 μL of Tris buffer solution containing DDM and NTM and then allowed to stand on ice for 5 min. The plasma was mixed with the anti-Aβ antibody beads and shaken on ice for 1 hour. The antibody beads were then washed three times with 100 μL of Tris buffer solution containing DDM and NTM and twice with 50 μL of 50 mM ammonium acetate buffer solution, and then, the target peptides bound to the antibody beads were eluted with a glycine buffer solution containing DDM. The eluent was mixed with a Tris buffer solution containing DDM and then mixed with antibody beads and shaken on ice for 1 hour. The antibody beads were then washed five times with 50 μL of Tris buffer solution containing DDM, twice with 50 μL of 50 mM ammonium acetate buffer solution, and once with 30 μL of $H_2O$, and then, the peptides bound to the antibody beads were eluted with 5 μL of eluent (70% (v/v) acetonitrile containing 5 mM hydrochloric acid). As the eluent, one containing L-methionine and one containing no L-methionine were used. The concentrations of L-methionine were 0.0067 to 67 μM. The target peptide eluted by immunoprecipitation was subjected to MALDI-TOF MS under the same conditions as in the case of the example of the second embodiment in the section 2-1 described above.

Figure 24:
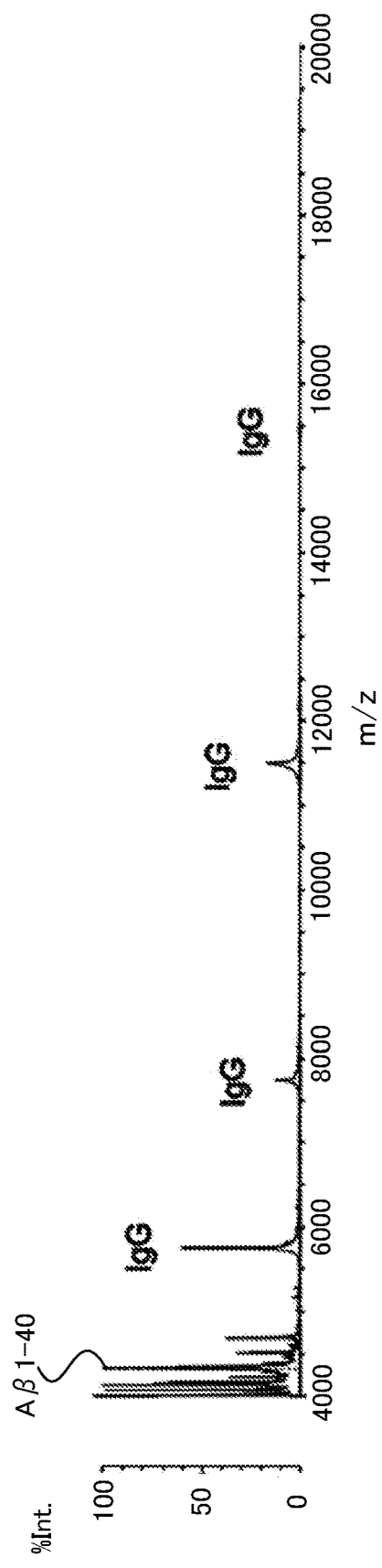
FIG. 24 is a mass spectrum of an eluent obtained by immunoprecipitation

FIG. 24 is a mass spectrum of an eluent obtained by immunoprecipitation. In FIG. 24, m/z is in the range of 4000 to 20000, and the peak of Aβ1-40 is shown on the left side. From a mass spectrum of eluent in FIG. 24 where peaks of IgG are observed, it can be seen from the fact, a sample obtained by treating human plasma with immunoprecipitation contains an antibody bead-derived IgG. Thus, it is not necessary to add proteins such as BSA for prevention of oxidation, but the addition of low-molecular-weight oxygen-capturing substance such as amino acid may further inhibit the oxidation. Therefore, whether or not the oxidation of target peptide is further inhibited by addition of methionine was evaluated.

Figure 25:
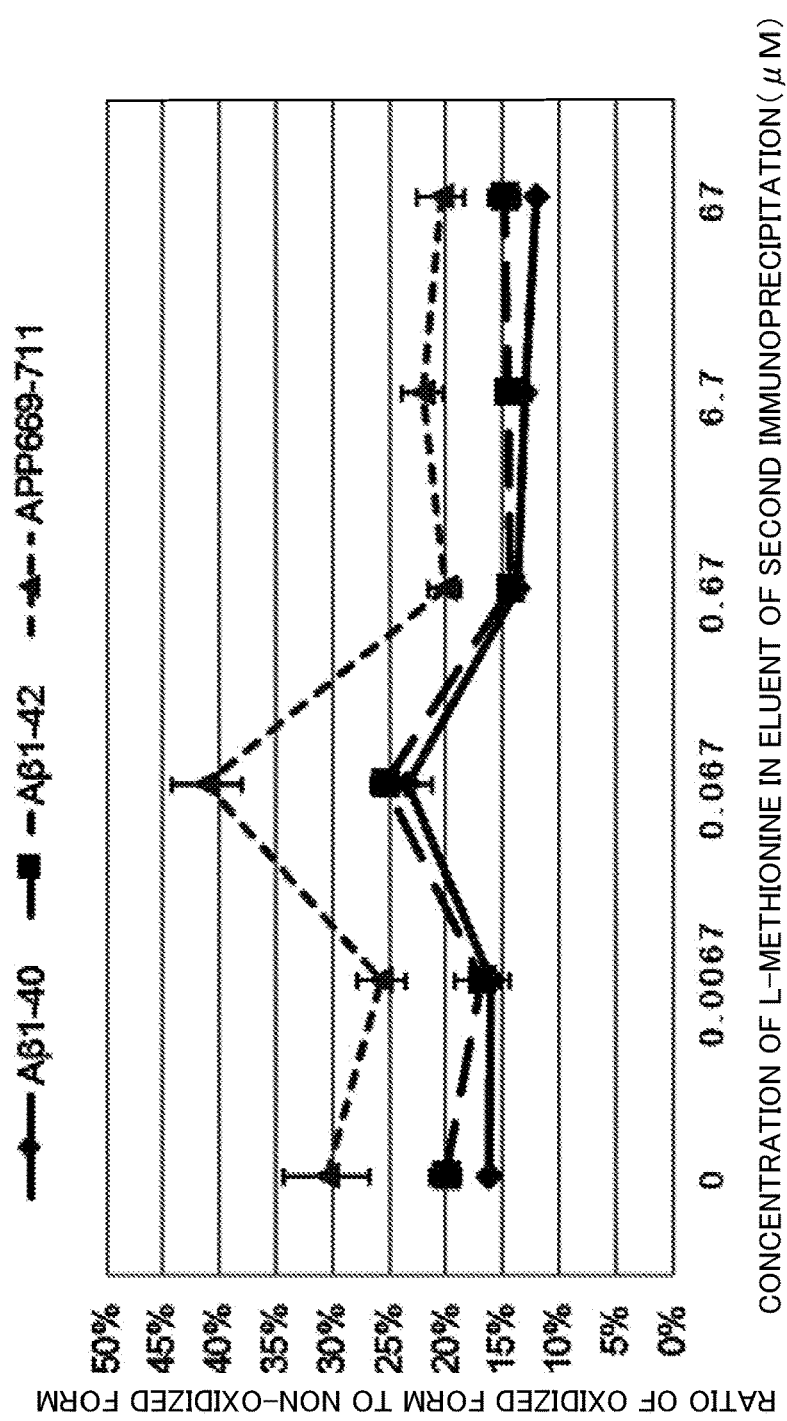
FIG. 25 is a graph showing a relationship between the concentration of L-methionine in an eluent obtained by immunoprecipitation and the ratio of an oxidized form to a non-oxidized form in each peptide based on mass spectra.

FIG. 25 is a graph showing a relationship between the concentration of L-methionine in an eluent obtained by immunoprecipitation and the ratio of an oxidized form to a non-oxidized form in each of peptides based on mass spectra. The ratio of the peak intensity of the oxidized form to that of the non-oxidized form decreased in the eluent containing L-methionine compared to the eluent containing no L-methionine. Inhibition of oxidation was evaluated by Dunnett's test with a significance level of $p<0.05$. The ratio of the oxidized form of at least one of the three kinds of target peptides was statistically significantly reduced when the concentration of L-methionine was 0.67 μM or more, compared to the control with no amino acid addition. These results indicate that the presence of a low-molecular-weight oxygen-capturing substance such as L-methionine in the samples after immunoprecipitation inhibits the oxidation.

The present invention is not limited by the above embodiments. Other aspects conceivable within the scope of the technical idea of the present invention are encompassed in the scope of the present invention.

REFERENCE SIGNS LIST 1, 2: kit for use in mass spectrometry, 10: antioxidative protein, 20: matrix, 30: sample plate, 31: well, 40: low-molecular-weight oxygen-capturing substance, C1, C2, C3: container

The invention claimed is:

1. An analysis method for analyzing peptide containing methionine comprising:
   preparing an analyzed sample containing a methionine-oxidized form and a methionine-non-oxidized form of a peptide to be analyzed, wherein the methionine non-oxidized form of the peptide has no oxidized sulfur atom in a side chain of oxide methionine residue;
   preparing a mixed sample containing the analyzed sample and an antioxidizing agent for preventing oxidation of a methionine residue of the methionine-non-oxidized form of the peptide on a sample plate for laser desorption/ionization mass spectrometry, the antioxidizing agent containing a protein;
   placing the mixed sample on the sample plate for laser desorption/ionization mass spectrometry;
   ionizing the mixed sample containing the peptide placed on the sample plate by laser desorption/ionization; and
   mass-separating the methionine-oxidized form and the methionine-non-oxidized form of the peptide contained in the mixed sample and detecting at least one of the methionine-oxidized form and the methionine-non-oxidized form of the peptide that has been ionized, wherein
   the protein contained in the antioxidizing agent prevents the oxidation of the methionine residue of the methionine-non-oxidized form of the peptide in the mixed sample by causing its own oxidation in the mixed sample.

2. The analysis method according to claim 1, wherein the laser desorption/ionization is matrix-assisted laser desorption/ionization.

3. The analysis method according to claim 1, wherein a concentration of the protein contained in the antioxidizing agent is 27.5 nM or more to less than 275 nM.

4. The analysis method according to claim 3, wherein the concentration of the protein contained in the antioxidizing agent is 27.5 nM or more to less than 260 nM.

5. The analysis method according to claim 4, wherein the concentration of the protein contained in the antioxidizing agent is 45.2 nM or more to less than 151 nM.

6. The analysis method according to claim 1, wherein:
   the antioxidizing agent contains, besides the protein, an amino acid and/or reducing agent.

7. The analysis method according to claim 6, wherein the amino acid and/or reducing agent is at least one compound selected from the group consisting of methionine, histidine, cysteine, tryptophan, dithiothreitol, tris (2-arboxyethyl) phosphine, 2-mercaptoethanol, tri-n-butylphosphine, dithioerythritol, ascorbic acid, polyphenol, sodium pyrosulfite, citric acid, glucose, carotene, tocopherol, thio-glycolic acid, N-acetylcysteine, hydroxylamine, reduced glutathione, 2-aminoethyl isothiouronium bromide, and thioglycerol.

8. The analysis method according to claim 6, wherein a concentration of the amino acid and/or reducing agent is 0.001 mM or more to 10 mM or less.

9. The analysis method according to claim 1, further comprising:
   purifying the peptide by affinity purification including eluting the peptide; wherein
   the protein is a ligand used in the affinity purification; and
   in the affinity purification, before or after elution of the peptide with an eluent, adding an amino acid and/or reducing agent to the eluent.

10. The analysis method according to claim 9, wherein the amino acid and/or reducing agent is at least one compound selected from the group consisting of methionine, histidine, cysteine, tryptophan, dithiothreitol, tris (2-carboxyethyl) phosphine, 2-mercaptoethanol, tri-n-butylphosphine, dithioerythritol, ascorbic acid, polyphenol, sodium pyrosulfite, citric acid, glucose, carotene, tocopherol, thio-glycolic acid, N-acetylcysteine, hydroxylamine, reduced glutathione, 2-aminoethyl isothiouronium bromide, and thioglycerol.

11. The analysis method according to claim 9, wherein a concentration of the amino acid and/or reducing agent is 0.0001 mM or more to 10 mM or less.

12. The analysis method according to claim 1, wherein the sample plate includes a plurality of wells into which the mixed sample is place and an amount of the protein contained in the antioxidizing agent is 1 to 30 ng/well.

13. The analysis method according to claim 12, wherein the amount of the protein contained in the antioxidizing agent is 3 to 30 ng/well.

14. The analysis method according to claim 13, wherein the amount of the protein contained in the antioxidizing agent is 3 to 10 ng/well.

* * * * *

SEQUENCE LISTING

```
<160> NUMBER OF SEQ ID NOS: 3

<210> SEQ ID NO 1
<211> LENGTH: 40
<212> TYPE: PRT
<213> ORGANISM: Homo sapiens
<220> FEATURE:
<221> NAME/KEY:
<223> OTHER INFORMATION: Abeta1-40

<400> SEQUENCE: 1

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40

<210> SEQ ID NO 2
<211> LENGTH: 42
<212> TYPE: PRT
<213> ORGANISM: Homo sapiens
<220> FEATURE:
<221> NAME/KEY:
<223> OTHER INFORMATION: Abeta1-42

<400> SEQUENCE: 2

Asp Ala Glu Phe Arg His Asp Ser Gly Tyr Glu Val His His Gln Lys
1               5                   10                  15
```

```
Leu Val Phe Phe Ala Glu Asp Val Gly Ser Asn Lys Gly Ala Ile Ile
            20                  25                  30

Gly Leu Met Val Gly Gly Val Val Ile Ala
        35                  40

<210> SEQ ID NO 3
<211> LENGTH: 43
<212> TYPE: PRT
<213> ORGANISM: Homo sapiens
<220> FEATURE:
<221> NAME/KEY:
<223> OTHER INFORMATION: APP669-711

<400> SEQUENCE: 3

Val Lys Met Asp Ala Glu Phe Arg His Asp Ser Gly Tyr Glu Val His
1               5                   10                  15

His Gln Lys Leu Val Phe Phe Ala Glu Asp Val Gly Ser Asn Lys Gly
            20                  25                  30

Ala Ile Ile Gly Leu Met Val Gly Gly Val Val
            35                  40
```